(12) United States Patent
Agarwal et al.

(10) Patent No.: US 12,470,860 B2
(45) Date of Patent: Nov. 11, 2025

(54) POWER EFFICIENT ALWAYS-ON LOW ENERGY BLUETOOTH ADVERTISING

(71) Applicant: QUALCOMM Incorporated, San Diego, CA (US)

(72) Inventors: Vishal Agarwal, Bangalore (IN); Srivathsa Sridhara, Bengaluru (IN); Christopher Kong Yee Chun, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 299 days.

(21) Appl. No.: 18/194,057

(22) Filed: Mar. 31, 2023

(65) Prior Publication Data

US 2024/0334109 A1    Oct. 3, 2024

(51) Int. Cl.
*H04R 1/10*        (2006.01)
*H04W 52/02*       (2009.01)

(52) U.S. Cl.
CPC ........ *H04R 1/1025* (2013.01); *H04W 52/028* (2013.01)

(58) Field of Classification Search
CPC ................ H04R 1/1016; H04R 1/1025; H04R 2420/07; H04R 1/1041; H04W 4/80; H04W 40/10; H04W 52/0274; H04W 52/0277; H04W 52/028; H04W 52/0261; G06F 1/3212; H02J 7/0048; H02J 7/00034; H02J 7/0014; H02J 7/0063; H02J 9/005
See application file for complete search history.

(56) References Cited

U.S. PATENT DOCUMENTS

| | | | |
|---|---|---|---|
| 9,949,205 B2 | 4/2018 | Newham | |
| 2020/0107262 A1* | 4/2020 | Shaw | ................ H04W 52/0216 |
| 2020/0154358 A1 | 5/2020 | Lovich | |
| 2021/0352766 A1 | 11/2021 | Srivastava et al. | |
| 2022/0353666 A1* | 11/2022 | Soldano | ................ H04W 8/005 |
| 2023/0236649 A1* | 7/2023 | Ahn | ........................ H04W 4/80 |
| | | | 713/300 |

OTHER PUBLICATIONS

International Search Report and Written Opinion—PCT/US2024/013034—ISA/EPO—Aug. 14, 2024.
Partial International Search Report—PCT/US2024/013034—ISA/EPO—Jun. 24, 2024. 14 pages.

* cited by examiner

*Primary Examiner* — Jason R Kurr
(74) *Attorney, Agent, or Firm* — Muncy, Geissler, Olds & Lowe, P.C.

(57) ABSTRACT

Various embodiments include systems and methods for balancing battery cycles of paired earbuds. A processor in an earbud charging case may receive battery level information from a first earbud operating in a deep sleep mode, determine a battery differential index (BDI) value, and send an instruction message to the first earbud indicating the first earbud should switch roles with a second earbud. An earbud may start a timer upon beginning to operate in a dormant mode, transition from operating in the dormant mode to operating in a non-dormant mode in response to expiration of the timer, send a message to a paired earbud indicating that the earbud has transitioned, and receive a message from the paired earbud indicating that the earbud should switch from operating in the dormant mode to operating in the deep sleep mode and periodically broadcasting an advertisement.

10 Claims, 14 Drawing Sheets

POWER EFFICIENT ALWAYS-ON LOW ENERGY BLUETOOTH ADVERTISING

BACKGROUND

Bluetooth Low Energy (BLE) is a wireless communication technology that serves to provide a low-power and low-cost alternative to classic Bluetooth (BT) technology. BLE is designed specifically for devices that need to operate for long periods of time on small batteries, such as fitness trackers, smart home devices, and wearable technology (earbuds, smartwatches, etc.). Since BLE consumes significantly less power than classic Bluetooth, BLE devices may remain connected and communicate with other BLE-enabled devices while consuming minimal battery life. Additionally, BLE allows for transmitting small amounts of data over short distances, making it well-suited for applications where high data transfer rates are not required, such as wireless earbuds.

SUMMARY

Various aspects include methods of balancing a battery cycle of earbuds. Various aspect methods may include starting, by a processor in an earbud, a timer upon beginning to operate in a dormant mode, transitioning from operating in the dormant mode to operating in a non-dormant mode in response to expiration of the timer, sending a message to a paired earbud indicating that the earbud has transitioned from operating in the dormant mode to operating in a deep sleep mode and periodically broadcasting an advertisement, and receiving a message from the paired earbud indicating that the earbud should switch from operating in the dormant mode to operating in the deep sleep mode and periodically broadcasting the advertisement.

Some aspects may further include monitoring while in the deep sleep mode for the message from the paired earbud indicating that the paired earbud has transitioned from operating in the dormant mode to operating in the non-dormant mode and transitioning to the dormant mode in response to receiving the message from the paired earbud. In some aspects, battery level information may be included in broadcast advertisements. Some aspects may further include determining a battery differential index (BDI) value based on a difference between a battery level of the earbud and a battery level of the paired earbud, and sending an instruction message to the paired earbud indicating the paired earbud should switch from operating in the dormant mode to operating in the deep sleep mode and periodically broadcasting the advertisement in response to determining that the BDI exceeds a battery threshold value.

Some aspects may further include determining an advertising role duration value based on the BDI, which may include the advertising role duration value in the instruction message sent to the paired earbud indicating the paired earbud should switch from operating in the dormant mode to operating in the deep sleep mode and periodically broadcasting the advertisement, updating the timer based on the advertising role duration value, and starting the timer upon beginning to operate in the dormant mode.

Further aspects include methods of balancing battery cycles of earbuds in a charging case. Such aspect methods may include receiving, by a processor in the charging case, battery level information from a first earbud operating in a deep sleep mode, determining, by the processor in the charging case, a battery differential index (BDI) value based on a difference between a battery level of the first earbud and a battery level of a second earbud, and sending, by the processor in the charging case, an instruction message to the first earbud indicating the first earbud should switch roles with the second earbud in response to the BDI value exceeding a battery threshold value.

Some aspects may further include receiving, by the processor in the charging case, battery level information from the first earbud operating in the deep sleep mode via a wired connection or physical pin. Some aspects may further include receiving, by the processor in the charging case, battery level information from the first earbud operating in the deep sleep mode by receiving a low energy (LE) advertisement that may include the battery level information from the first earbud.

Some aspects may further include computing, by the processor in the charging case, the battery threshold value based on a battery level of the second earbud when the second earbud entered a dormant mode. Some aspects may further include computing, by the processor in the charging case, the battery threshold value such that the battery threshold value may be less than the battery level of the second earbud when the second earbud entered the dormant mode.

Some aspects may further include computing, by the processor in the charging case, the battery threshold value as a percentage value that identifies a percentage difference between the battery level of the first earbud and the battery level of the second earbud. Some aspects may further include commencing charging the first earbud when the battery level of the first earbud is less than a charging threshold value.

Some aspects may further include the processor in the charging case sending the instruction message to the first earbud indicating the first earbud should switch roles with the second earbud in response to the first earbud reaching full charge. Some aspects may further include the processor in the charging case ceasing charging the earbud and commencing charging the second earbud in response to sending the instruction message to the first earbud indicating the first earbud should switch roles with the second earbud. Some aspects may further include the processor in the charging case ceasing charging the first earbud and commencing charging the second earbud in response to determining that the first earbud has entered a dormant mode and the second earbud has entered the deep sleep mode.

Further aspects may include an earbud having a processor configured with processor-executable instructions to perform various operations corresponding to any of the methods summarized above. Further aspects may include an earbud having various means for performing functions corresponding to any of the methods summarized above. Further aspects may include a non-transitory processor-readable storage medium having stored thereon processor-executable instructions configured to cause a processor in an earbud to perform various operations corresponding to any of the methods summarized above.

Further aspects may include a charging case having a processor configured with processor-executable instructions to perform various operations corresponding to any of the methods summarized above. Further aspects may include a charging case having various means for performing functions corresponding to any of the methods summarized above. Further aspects may include a non-transitory processor-readable storage medium having stored thereon processor-executable instructions configured to cause a processor in a charging case to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
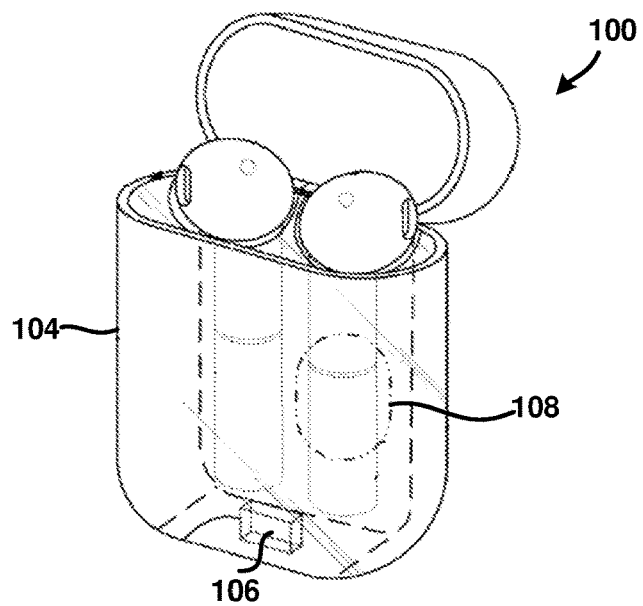
FIG. 1A is a perspective view of a charging case that includes a pair of earbuds that may be configured to balance their battery cycles in accordance with some embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, various embodiments include earbuds that include a timer and a processor configured to start the timer upon beginning to operate in a dormant mode, and transition from operating in the dormant mode to operating in a non-dormant mode, such as a deep sleep mode in response to expiration of the timer. The processor may send a message to a paired earbud indicating that the earbud has transitioned from the dormant mode to operating in a deep sleep mode during which the processor may periodically broadcast an advertisement. The process may then receive a message from the paired earbud indicating that the earbud should switch from operating in deep sleep mode and periodically broadcasting an advertisement to operating in the dormant mode.

Various embodiments may include a charging case that includes a processor configured to receive a low energy (LE) advertisement that includes battery level information from an earbud operating in a deep sleep mode. The processor may determine a battery differential index (BDI) value based on a difference between a battery level of the earbud and a battery level of a paired earbud, and send an instruction message to the earbud indicating the earbud should switch roles with the paired earbud in response to the BDI value exceeding a battery threshold value.

The earbud and/or charging case may perform various battery cycle balancing operations to improve the performance, battery life, and power consumption characteristics of the earbuds. For example, the earbud and/or charging case may operate so that earbud batteries are charged and discharged evenly. As such, the embodiments may reduce or prevent one battery from being overcharged while the other remains undercharged and/or one battery from being overused while the other remains underutilized. For these and other reasons, the values embodiments may prolong the battery life of the devices, improve the user experience, and balance various tradeoffs between the performance and power consumption characteristics of wireless devices. Additional features, benefits and enhancements will be evident from the disclosures below.

The term "battery cycle" is used herein to refer to the process of charging a battery and discharging it. Each time a battery undergoes a charging and discharging cycle, it may be considered one battery cycle. The number of battery cycles a battery may undergo before it starts to degrade or lose capacity is an important factor in determining the lifespan of the battery. The number of cycles a battery may withstand may vary based on the properties and type of battery. Some batteries may undergo hundreds or thousands of cycles before they start to degrade, while others may only be able to withstand a few dozen cycles. Proper battery management and care, including ensuring that batteries are charged and discharged properly and evenly, may help prolong their lifespan and improve their performance.

The term "context-aware" is used herein to refer to software systems and devices that are configured to understand and make use of contextual information (e.g., location, time, user activities, etc.). Context-aware technologies have become increasingly important in the field of mobile and wearable devices (e.g., smartphones, earbuds, charging cases, etc.), which may now include or implement context-aware software platforms such as the Distributed Context Framework (DCF) or Google Nearby Presence (GNP). Such context-aware software platforms allow developers to build applications that understand and make use of contextual information. For example, DCF includes application programming interfaces (APIs) and other tools that allow devices to access and use context information about a user device (e.g., location, time, activity, etc.) to provide improved and more personalized services (e.g., location-based services, etc.).

Many context-aware platforms and applications use a Bluetooth Low Energy (BLE) advertisement feature that allows BLE devices (e.g., earbuds, etc.) to broadcast presence, availability, capability, and battery life information for reception by other computing devices. Always-on low energy (LE) advertising is a type of BLE advertisement that allows BLE devices to broadcast advertising data periodically, continuously, or at nearly all times, even when they are not actively in use, in a charging case, or operating in a low-power state. Examples of LE advertising data include a unique identifier (UUID), service information, presence information, availability information, battery life information, application-specific information, and role information. As an example, application-specific information may be used by a "Find My" feature (e.g., Google Finder®, Apple FindMy®, etc.) of a wireless device to locate a lost or stolen BLE device on a map. The role information may advertise a wireless device's role as a peripheral device (e.g., headset) or as a central device (e.g., smartphone). Some wireless devices, such as earbuds, may also advertise additional role information, such as whether they are a right earbud, a left earbud, a primary (master), a secondary (slave), etc.

Some embodiments may include a Bluetooth (BT) audio system on chip (ASOC) that includes low-power timer hardware, a BT/BLE radio, and processors configured to implement a context-aware software platform/system. The ASOC may be included in each earbud and/or in a charging case and configured to perform various battery cycle balancing operations to improve the performance and power consumption characteristics of wireless devices. For example, the ASOC may operate so that the batteries in a pair of earbuds are charged and discharged evenly, prevent one battery from being overcharged while the other remains undercharged, and/or prevent one battery from being overused while the other is underutilized. The ASOC may balance the battery cycles and prolong the battery life of the devices, improve the user experience, and balance various tradeoffs between the performance and power consumption characteristics of wireless devices.

In some embodiments, the ASOC (or other processing unit) may balance the battery cycles of the pair of earbuds by intelligently determining whether to cause the earbuds to transition earbud roles (e.g., primary, secondary) and/or power modes (e.g., deep sleep state, dormant state, etc.). In some embodiments, the ASOC may determine whether to cause the earbuds to transition earbud roles and/or power modes based on time. In some embodiments, the ASOC may determine whether to cause the earbuds to transition earbud roles and/or power modes based on a battery differential index (BDI) value that identifies a difference between the battery level of the first earbud and the battery level of the second earbud when it went into dormant mode. For example, an ASOC may send an instruction message to one or both of the earbuds indicating the earbuds should switch roles in response to the BDI value exceeding a battery threshold value. As is discussed in more detail below (e.g., with reference to FIGS. 1A and 1B), the battery threshold value may be determined so that it is less than the battery level of a paired or secondary earbud when it went into dormant mode and/or so that it is within a predefined limit (e.g., 5%, etc.) of the battery level of the paired/secondary earbud. As is discussed in more detail below, the determination as to whether to switch roles may be made in either of the earbuds or in a charging case.

Figure 1B:
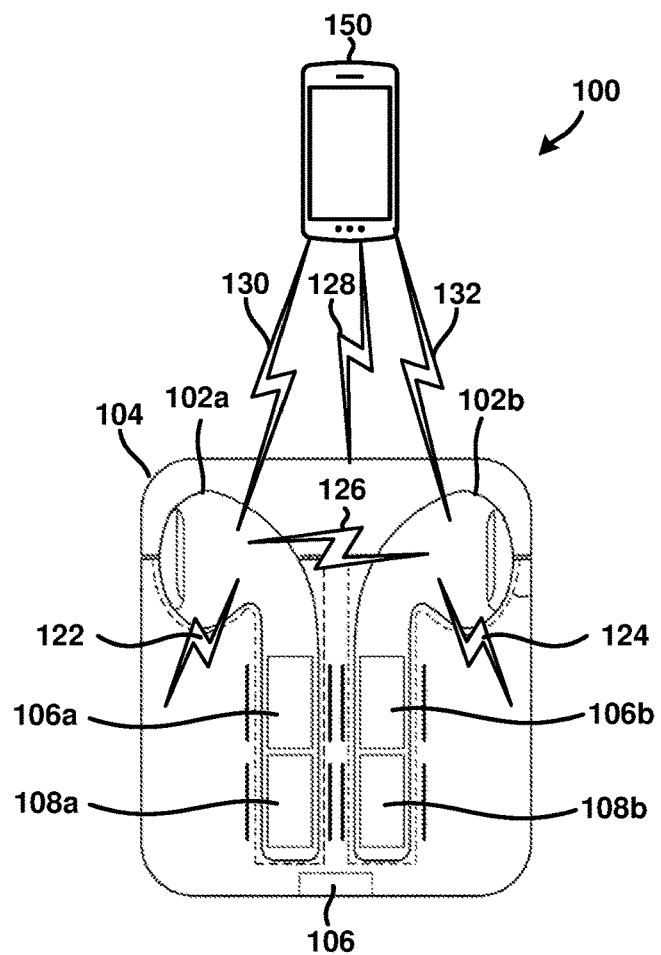
FIG. 1B is a component block diagram illustrating a system that includes a smartphone and earbuds in a charging case that may configured to operate in accordance with the various embodiments.

FIG. 1A is a perspective view of a charging case 104. FIG. 1B illustrates a system 100 that includes earbuds 102a, 102b, the charging case 104, and a smartphone 150, any or all of which may be a BT/BLE device and/or configured to operate in accordance with the various embodiments. With reference to FIGS. 1A and 1B, the charging case 104 may include cavities to hold a left earbud 102a and a right earbud 102b. The charging case 104 and each of the earbuds 102a, 102b may include an audio system on chip (ASOC) 106a, 106b and a battery 108. Each of the left earbud 102a, right earbud 102b, charging case 104, and smartphone 150 may include wireless communication links 122, 124, 126, 128, 130, 132 to each of the other devices 102a, 102b, 104, 150 in the system 100. The charging case 104 may also communicate with each of the earbuds 102a, 102b using physical pins (e.g., pogo pins, etc.).

The charging case 104 may be configured to use its battery 108a, 108b to charge or re-energize the batteries 108a, 108b of the earbuds 102a, 102b when they are placed inside the charging case 104. In some embodiments, the charging case 104 may be configured to charge one of the earbuds 102a, 102b at a time. In some embodiments, the charging case 104 may be configured to select the earbud 102a, 102b for charging based on role, state, and/or battery information received from one or both of the earbuds 102a, 102b.

The ASOC 106a, 106b may be configured to provide wireless communications between the earbuds 102a, 102b and other devices (e.g., smartphones). Some earbuds 102a, 102b may include a single Bluetooth chip that is responsible for handling the communication for both the left earbud 102a and the right earbud 102b. In the example illustrated and described with reference to FIGS. 1A and 1B, the earbuds 102a, 102b implement a dual-chip architecture that includes two separate ASOCs 106a, 106b, one for each earbud 102a, 102b. The dual-chip architecture may allow each earbud 102a, 102b in the pair to operate as a primary (master) earbud that broadcasts the LE advertisements and/or conducts BT/BLE communications with other wireless devices. Typically, only one of the earbuds 102a, 102b in a pair functions as the primary, while the other operates as the secondary.

The earbuds 102a, 102b may coordinate and communicate with each other to determine the earbud 102a, 102b in the pair that operates as the primary earbud (and thus broadcasts LE advertisements) and/or the earbud 102a, 102b that operates as the secondary earbud (and thus may conserve power). The earbuds 102a, 102b may perform role-switching operations to determine their roles. For example, both earbuds 102a, 102b may start advertising as peripherals with each broadcasting its UUID. One earbud 102a, 102b may be initially designated as the primary, and the other the secondary. The earbuds 102a, 102b may also coordinate and communicate to determine the earbud 102a, 102b that initially operates as the primary earbud and the earbud 102a, 102b that initially operates as the secondary earbud. The primary earbud may periodically send out advertising packets with its UUID and a "Role Flag" set to 0. The secondary earbud may send out advertising packets with its UUID and the Role Flag set to 1. A central device (e.g., charging case 104, smartphone 150, etc.) may scan for nearby peripherals and receive the advertising packets from both earbuds 102a, 102b. Based on the UUIDs, the central device may identify both earbuds 102a, 102b as being part of the same pair. The central device may also determine the earbud 102a, 102b that operates as the primary earbud and the earbud 102a, 102b that operates as the secondary earbud, and send a command to the primary earbud to switch roles with the secondary earbud.

The primary earbud may be responsible for communicating with the central device and/or sending LE advertisements. Since the LE advertisements and BT/BLE communications consume power, the battery 108a, 108b of the earbud 102a, 102b operating as the primary may drain faster than the battery 108a, 108b of the earbud 102a, 102b operating as the secondary. As such, in some embodiments, the earbuds 102a, 102b may be configured to alternate roles as primary/secondary so that the primary earbud does not consume all of its battery resources while the battery resources of the secondary remain underutilized. In addition, by periodically switching between primary and secondary roles, the earbuds 102a, 102b may balance the battery cycle to prolong the battery life of their respective batteries 108a, 108b. Balancing the battery cycle may include managing the battery charging and discharging cycles so that the batteries 108a, 108b in the earbuds 102a, 102b are charged and discharged evenly, receive equal amounts of power or charge, are used in a balanced manner, preventing one battery from being overcharged while the other is undercharged, and/or preventing one battery from being overused while the other is underutilized.

The earbuds 102a, 102b may operate in any of variety different power modes, such as an active mode, deep sleep mode, dormant mode, and power-off mode. In active mode, all or many of the ASOC 106a, 106b components and subsystems may be fully powered and operational. In power-off, all or many of the ASOC 106a, 106b components and subsystems may be fully powered off and not consuming power.

The deep sleep mode may be a power-saving mode in which some of the subsystems are throttled or de-energized to reduce power consumption (e.g., to 210 microamps, etc.). In deep sleep mode, the major subsystems (e.g., the application processor 208, BT/BLE radio processor 206, etc.) remain active to provide select functionality, such as periodically broadcasting LE advertisements (which may increase power consumption to 320 microamps for the duration of the broadcast). In some embodiments, the charging case 104 may be configured to charge the earbud 102a, 102b that is in deep sleep mode.

The dormant mode may be a low-power mode that the earbuds 102a, 102b may enter when they are not being used but are still powered on. In dormant mode, the earbuds 102a, 102b consume very little power (e.g., 23 microamps, etc.) but may be awakened quickly to resume normal operation. Said another way, the earbuds 102a, 102b consume less power when they are in dormant mode than when they are in deep sleep mode. In some embodiments, the earbuds 102a, 102b may be configured to set a timer when they enter the dormant mode, and to wake up in response to detecting the expiration of the timer to determine whether to switch roles with the primary earbud. Using a timer in various embodiments enables earbuds 102a, 102b to remain in the dormant mode for a predetermined duration to conserve battery energy, eliminating the need to power up to monitor for signals from another earbud or charging case.

In some embodiments, the earbuds 102a, 102b may be configured to intelligently enter and exit the different power modes to balance tradeoffs between performance and power consumption. For example, the secondary earbud may enter dormant mode when it is not being used. The primary earbud may enter and operate in deep sleep mode when it is not being used so that it may continue to periodically broadcast LE advertisements. Thus, when not in use, the primary earbud may operate in deep sleep mode and the secondary earbud may operate in dormant mode.

The earbuds 102a, 102b may alternate roles as primary and secondary so that their batteries charge and discharge evenly. The operations for alternating roles may include transitioning the earbuds 102a, 102b between the dormant and deep sleep modes, which may include booting the chip, performing radio calibration, batch loading, and other similar operation that could consume a significant amount of the available battery resources and/or drain the batteries 108a, 108b. As such, alternating roles too frequently may consume an excessive amount of the available battery resources. Accordingly, in some embodiments the earbuds 102a, 102b and/or charging case 104 may be configured to intelligently alternate roles to improve the power consumption characteristics of the earbuds 102a, 102b, to prolong the battery life of batteries 108a, 108b in the earbuds 102a, 102b, and/or so that the batteries 108a, 108b in the primary and secondary earbuds 102a, 102b charge and discharge more evenly.

The charging case 104 and earbud 102a, 102b may be configured to support always-on LE advertisements and improve the power consumption characteristics of the earbuds 102a, 102b, even when they are in the charging case 104. In some embodiments, the charging case 104 may be configured to control which of the earbuds 102a, 102b is assigned as the primary earbud for LE advertising. In some embodiments, the earbuds 102a, 102b may be configured to detect or determine whether the charging case 104 is unable to communicate with earbuds 102a, 102b, whether the battery of the charging case 104 has been fully discharged, and/or whether the earbuds 102a, 102b have been outside of the charging case 104 for an extended period of time. In response, the earbuds 102a, 102b may communicate with one another (e.g., using a Bluetooth link for signaling purposes, etc.) and determine the earbud 102a, 102b that should operate as the primary earbud.

In some embodiments, as part of the operations for switching roles, the earbud 102a, 102b or charging case 104 may set a timer and/or periodically measure the battery level of the primary earbud. Once the timer or battery level reaches a threshold value, the earbuds 102a, 102b or charging case 104 may cause the current primary earbud to put itself into dormant mode and/or cause the current second earbud to exit the dormant mode and determine whether to commence operating as the new primary earbud. In some embodiments, the charging case 104 may be configured to not charge the earbud 102a, 102b that is in dormant mode (e.g., because it cannot communicate with the earbud to receive battery information while the earbud is in dormant mode, etc.). The earbuds 102a, 102b or charging case 104 may keep alternating the primary and secondary roles until the batteries are fully charged or fully discharged, or until some charge threshold is reached (e.g., 95% of max, etc.).

In some embodiments, the charging case 104 and/or earbud devices may be configured to calculate a battery threshold value for a newly designated primary earbud. The battery threshold value may be determined so that it is less than the 'battery level' of the secondary earbud when it went into dormant mode. The battery threshold value may also be computed so that it is also within a predefined limit (e.g., 5%, etc.) of the 'battery level' of the secondary earbud. If the battery levels are the same in the first iteration, the charging case 104 or earbuds 102a, 102b may select an earbud 102a, 102b at random (or select a predesignated earbud) to operate as the primary earbud.

In some embodiments, the earbuds 102a, 102b may be equipped with timer hardware (e.g., low power clock/crystal component 228 illustrated in FIG. 2) that allows the secondary earbud to track time while in dormant mode. After a period of time (e.g., the expiration of a timer, etc.), the secondary earbud may signal the current primary earbud to determine whether it should transition out of the dormant mode and into deep sleep mode. The primary and secondary earbuds 102a, 102b may also exchange battery level information and determine/negotiate the amount of time each earbud is to perform LE advertising operations before they switch roles. The new secondary earbud may enter dormant mode for the determined amount of time. The above operations may be performed repeatedly, and the devices may continue to alternate between the primary and secondary roles so that their batteries charge and discharge evenly.

In some embodiments, the charging case 104 may be configured to communicate with the earbuds 102a, 102b, receive current battery level information and earbud state information, compare the battery levels of the left and right earbuds, and determine whether the difference between the battery levels of the left and right earbuds exceeds a threshold value. The charging case 104 may allow the current primary device to continue to operate as the primary device in response to determining that the difference between the battery levels of the left and right earbuds does not exceed the threshold value. On the other hand, in response to determining that the difference between the battery levels of the left and right earbuds exceeds the threshold value, the charging case 104 may cause the current secondary device to exit the dormant state and commence operating as the primary device. That is, the charging case 104 may cause the earbud to switch roles and power states in response to determining that the difference between the battery levels of the left and right earbuds exceeds a threshold value (e.g., 5%, etc.).

Figure 2:
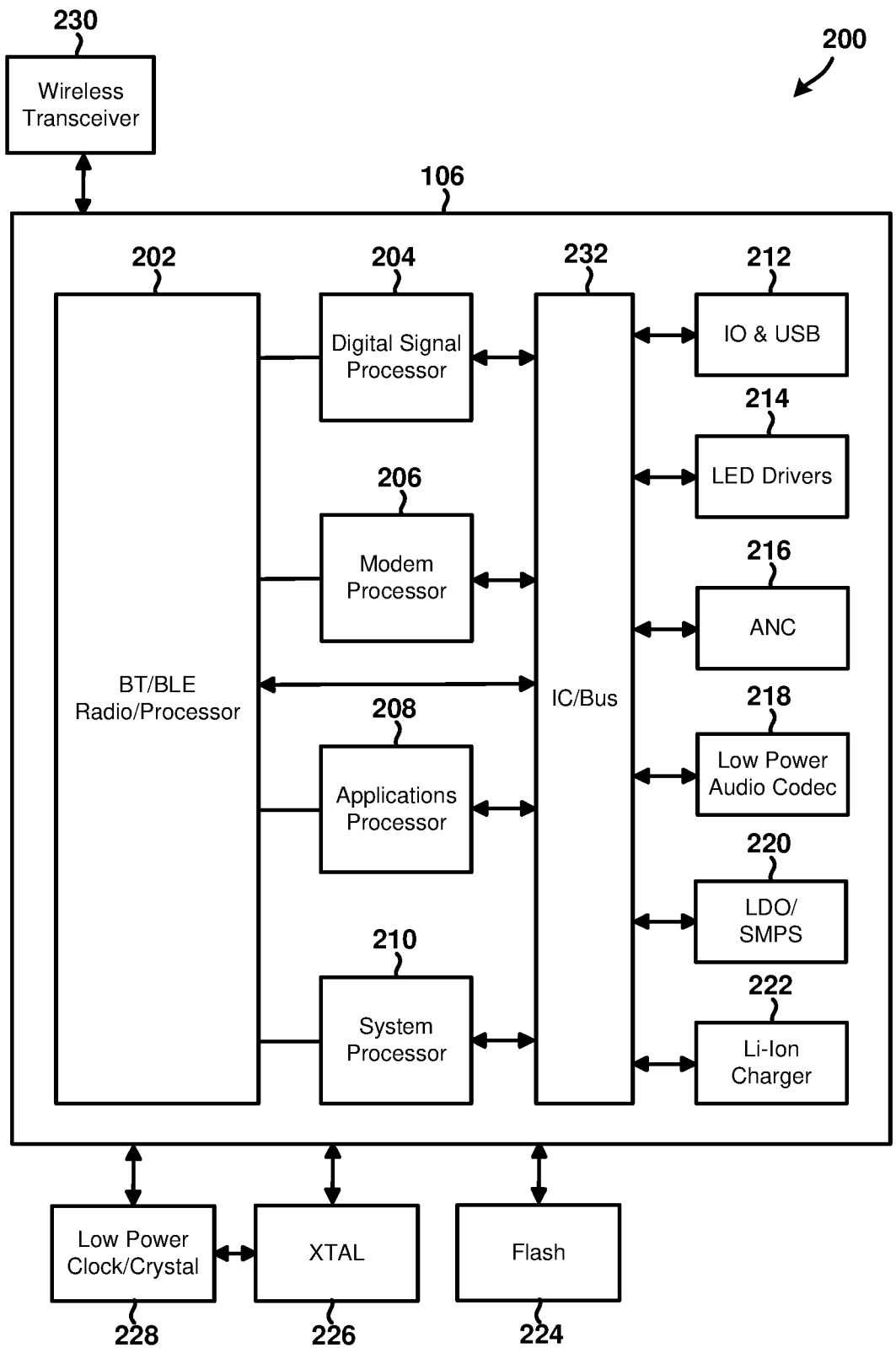
FIG. 2 is a component block diagram illustrating an example audio system on chip (ASOC) that could be included in a wireless device (e.g., earbuds, charging case, etc.) and configured in accordance with the various embodiments.

FIG. 2 illustrates an example ASOC 106a, 106b that could be included in a wireless device 200 (e.g., earbuds 102a, 102b, charging case 104, etc.) and configured in accordance with the various embodiments. With reference to FIGS. 1A-2, the ASOC 106a, 106b may include a BT/BLE radio and processor 202, a digital signal processor (DSP) 204, a modem processor 206, an applications processor 208, a system processor 210, an Input/Output (I/O) and Universal Serial Bus (USB) component 212, light emitting diode (LED) drivers 214, an active noise cancellation (ANC) component 216, a low power audio CODEC component 218, a low dropout regulator (LDO)/switched-mode power supply (SMPS) component 220, and a Lithium-ion (Li-Ion) charger component 222. In various embodiments, the ASOC 106a, 106b may include or may be coupled to a flash memory 224, an external crystal oscillator (XTAL) 226, and a low power clock/crystal component 228.

The ASOC 106a, 106b may implement a low-power or ultra-low power architecture for inclusion in speakers, headsets, earbuds 102a, 102b, and smaller devices (e.g., miniaturized earbuds, etc.) that generate high-quality wireless sound with longer audio playback between charges. In some embodiments, the ASOC 106a, 106b may be configured to support LE audio (e.g., Auracast™, etc.) up to 2 Mbps alongside traditional Bluetooth technology and provide lossless and high-resolution audio to the earbuds 102a, 102b.

The BT/BLE radio and processor 202 may be responsible for establishing and maintaining a wireless connection with other BT-enabled devices. The radio may be configured to operate on a specific frequency range and/or use frequency hopping spread spectrum (FHSS) to reduce interference and improve signal quality. When the earbud 102a, 102b is turned on, the radio may search for nearby devices that have Bluetooth enabled and initiate a pairing process. Once paired, the radio may transmit and receive data, such as audio signals, between the earbud 102a, 102b and the connected device. The radio may also manage power consumption by adjusting transmission power and entering low-power modes when not in use.

The DSP 204 may include one or more DSP processing units and/or cores that are responsible for processing audio signals. The DSP processing units and/or cores may be configured to perform a variety of operations, including audio decoding, noise cancellation, echo cancellation, and equalization. They may also be configured to handle the complex task of managing the BT connection between the earbud 102a, 102b and the paired device, handling the compression and decompression of audio data, and managing power consumption to optimize battery life. Additionally, the DSPs may be configured to run machine learning algorithms for more advanced features, such as voice recognition and gesture control.

The modem processor 206 may be configured to perform various operations related to wireless communications, such as establishing and maintaining a secure wireless connection wireless device or a network access point. The modem processor 206 may also be responsible for encoding and decoding digital signals to be transmitted over a wireless network, managing the wireless connection and handling network-related tasks, and perform security-related tasks, such as encrypting data before it is transmitted over the wireless network to ensure that the communication remains secure or private.

The applications processor 208 may be configured to perform various functions to provide advanced features and capabilities on the earbud 102a, 102b or charger case 106. For example, the applications processor 208 may be responsible for running the operating system and any software applications that are installed on the earbuds 102a, 102b. The applications processor 208 may be configured to handle the user interface and perform various functions such as voice recognition, touch controls, and advanced audio processing. The applications processor 208 may also be responsible for managing the Bluetooth connection and wireless firmware updates. The applications processor 208 may be support various sensors, such as accelerometers and gyroscopes, to enable features like gesture controls and fitness tracking.

The system processor 210 may be configured to manage the overall system operations of the earbud 102a, 102b or charger case 106. The system processor 210 may be responsible for controlling power management, clock generation, and device configuration. The system processor 210 may also be configured to manage the communications between different subsystems in the earbud 102a, 102b, such as the BT/BLE radio/processor 202, DSP 204, and applications processor 208. The system processor 210 may also be configured to manage the boot-up and shutdown sequence of the earbud 102a, 102b and monitor the system for errors or malfunctions.

The I/O and USB component 212 may be configured to manage the input and output of data to and from the earbuds 102a, 102b. The I/O and USB component 212 may include or support a variety of interfaces such as Inter-Integrated Circuit (I2C), Serial Peripheral Interface (SPI), Universal Asynchronous Receiver-Transmitter (UART), and USB. The I/O and USB component 212 may manage the communication between the various components of the earbud 102a, 102b, such as the BT/BLE radio/processor 202, DSP 204, and applications processor 208. The I/O and USB component 212 may include a USB interface that allows the earbud 102a, 102b to connect to external devices such as a computer for charging or data transfer. The I/O and USB component 212 may also perform various operations to ensures that the data is transferred accurately and securely between the different components and external devices.

The LED drivers 214 may be configured control any lighting elements included in the earbuds 102a, 102b. Such lighting elements may be used to indicate various states of the earbud, such as whether it is in pairing mode, connected to a device, or low on battery. The LED drivers 214 may receive signals from the applications processor 208 and convert them into a form that can be used to control the lighting elements. The LED drivers 214 may also adjust the brightness of the lighting elements, depending on the required functionality.

The ANC component 216 may be configured to capture ambient noise with a microphone and create an inverted sound wave to cancel out that noise. The ANC component 216 may be configured to work within a range of frequencies, and may be particularly useful for reducing low-frequency noise, such as the hum of an airplane engine or the rumble of a train. The ANC component 216 may be configured to work in conjunction with other components (e.g., DSP 204, low power audio CODEC component 218, etc.) to produce high-quality audio with minimal interference from external noise.

The low power audio CODEC component 218 may be configured to encode and decode audio signals with low power consumption. The low power audio CODEC component 218 may provide high-quality audio playback while minimizing the power requirements. The CODEC may be configured to support a wide range of audio formats and bit rates, and both digital and analog signals. In some embodiments, the low power audio CODEC component 218 may include a programmable equalizer configured for fine-tuning audio output to match a user's preferences. The low power audio CODEC component 218 may be configured to achieve low power consumption through efficient use of power-saving techniques, such as shutting down unused circuitry and operating at low voltages. This may allow the earbud 102a, 102b to deliver high-quality audio performance with improved battery life.

The LDO/SMPS component 220 may be configured to regulate and manage the power supply. For example, the LDO may reduce the voltage of the input power supply and provide a stable, regulated voltage output that is resistant to changes in the input voltage to the other components of the earbud 102a, 102b. The SMPS may use high frequency switching circuitry to convert the incoming voltage to a voltage level requested by the different components of the earbud 102a, 102b while also reducing power loss and improving battery life. The SMPS may also regulate the output voltage to prevent damage to the earbud 102a, 102b and protect the battery 108a, 108b from overcharging or over-discharging. The SMPS may also help to reduce the size and weight of the earbud 102a, 102b by eliminating the need for bulky transformers and reducing the size of capacitors and other passive components that would otherwise be required for power management.

The Li-Ion charger component 222 may be configured to charge the battery 108. The Li-Ion charger component 222 may use a switching regulator to convert the input voltage to the appropriate charging voltage for the Li-Ion battery. The charging process may include three stages: pre-charge, constant current charge, and constant voltage charge. During the pre-charge stage, the Li-Ion charger component 222 may supply a small current to the battery 108a, 108b until the voltage reaches a certain threshold. In the constant current charge stage, the Li-Ion charger component 222 may supply a constant current to the battery 108a, 108b until it reaches a certain level. In the constant voltage charge stage, the Li-Ion charger component 222 may supply a constant voltage to the battery 108a, 108b and reduce the charging current as the battery 108a, 108b reaches its fully charged state. The Li-Ion charger component 222 may also be equipped with various safety features such as over-voltage protection, over-current protection, and thermal protection to prevent damage to the battery 108a, 108b, earbud 102a, 102b or charging case 104.

The flash memory 224 may store various different types of data (e.g., firmware, configuration settings, etc.) and perform or support various memory operations, such as reading and writing data, erasing data, and performing other maintenance tasks. The flash memory 224 may be non-volatile storage that retains data even when there is no power supplied to the device. The flash memory 224 may be programmed with the initial firmware during the manufacturing process and may be updated with new firmware.

The XTAL 226 may be configured to generate and provide a precise and stable clock signal to the system. The clock signal generated by the XTAL 226 may be used by various components in the earbud 102a, 102b to synchronize their operations and ensure proper timing. For example, the BT/BLE radio and processor 202 and the DSPs 204 may rely on the clock signal to accurately time their operations and ensure reliable communication. The clock signal may also be used by the applications processor 208 to schedule tasks and ensure that they are executed in a timely manner.

The low power clock/crystal component 228 may include low-frequency oscillator, such as a Micro-Electro-Mechanical Systems (MEMS) oscillator, and/or other timer hardware that may be used by an earbud 102a, 102b to track time while the in earbud 102a, 102b is in dormant mode. The low power clock/crystal component 228 may operate at frequencies that are lower than those of traditional quartz crystal oscillators and consume much less power. MEMS oscillators are also small in size, making them suitable for integration in small electronic devices such as the earbuds 102a, 102b. In some embodiments, the low power clock/crystal component 228 may be configured to use advanced power management techniques to reduce power consumption.

In some embodiments, the ASOC 106a, 106b may include various components (e.g., processors 202-210) that operate as a processing unit that carries out the instructions of software application programs by performing the arithmetic, logical, control and input/output (I/O) operations specified by the instructions. In some embodiments, the ASOC 106a, 106b may include various components that operate as a processing unit for managing BT/BLE operations during a low power mode of operation and during transitions between a low power mode and an active mode. In some embodiments, the ASOC 106a, 106b may include one or more coprocessors, memory, custom circuitry, system components and resources, a Bluetooth controller, and an interconnection/bus (IC/Bus) module 232, interface circuitry and/or various additional processors, such as a packet processor. The Bluetooth controller may be communicably coupled to a wireless transceiver 230, and may be configured to transmit and receive Bluetooth data to and from the wireless transceiver 230. The wireless transceiver 230 may be configured to transmit and receive wireless communications (e.g., messages including BT data and context information) via an antenna (not shown) to/from wireless computing devices, such as a BT-capable wireless device.

The ASOC 106a, 106b may also include various system components, resources, and custom circuitry for managing sensor data, analog-to-digital conversions, wireless data transmissions, and for performing other specialized operations, such as decoding data packets, processing encoded audio signals, and sending data for rendering in a web browser or audio/video application. For example, the ASOC 106a, 106b may include power amplifiers, voltage regulators, oscillators, phase-locked loops, peripheral bridges, data controllers, memory controllers, system controllers, access ports, timers, and other similar components used to support the processors and software clients running on a wireless device. The system components and resources and/or custom circuitry may also include circuitry to interface with peripheral devices, such as wireless communication devices, external memory chips, etc.

The various processors 202-210 may be interconnected to one or more Bluetooth controllers, memory elements, system components and resources, and custom circuitry via an interconnection/bus module 232. The interconnection/bus module 232 may include an array of reconfigurable logic gates and/or implement a bus architecture (e.g., CoreConnect, AMBA, etc.). Communications may be provided by advanced interconnects, such as a high-performance networks-on chip (NoC).

Each processor 202-210 may include one or more cores, and each processor/core may perform operations independent of the other processors/cores. In addition, any or all of the processors 202-210 may be included as part of a processor cluster architecture (e.g., a synchronous processor cluster architecture, an asynchronous or heterogeneous processor cluster architecture, etc.).

In addition to the example wireless device 200 discussed above, various embodiments may be implemented in a wide variety of computing systems, which may include a single processor, multiple processors, multicore processors, or any combination thereof.

Figure 3:
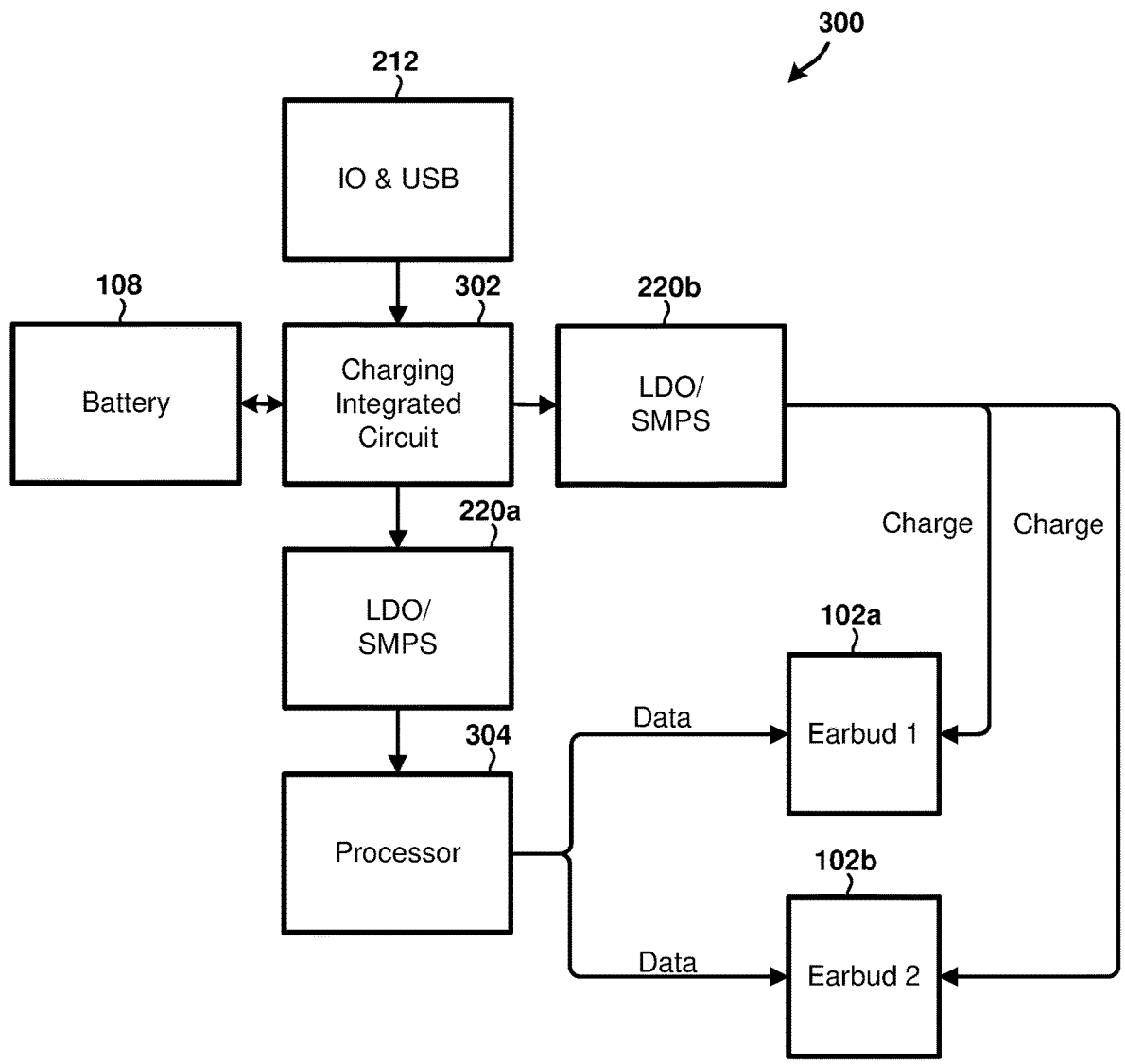
FIGS. 3 and 4 are component block diagrams that illustrate various components, operations, and interactions between the components in a wireless device (e.g., earbud, charging case) that could be configured in accordance with the various embodiments.
Figure 4:
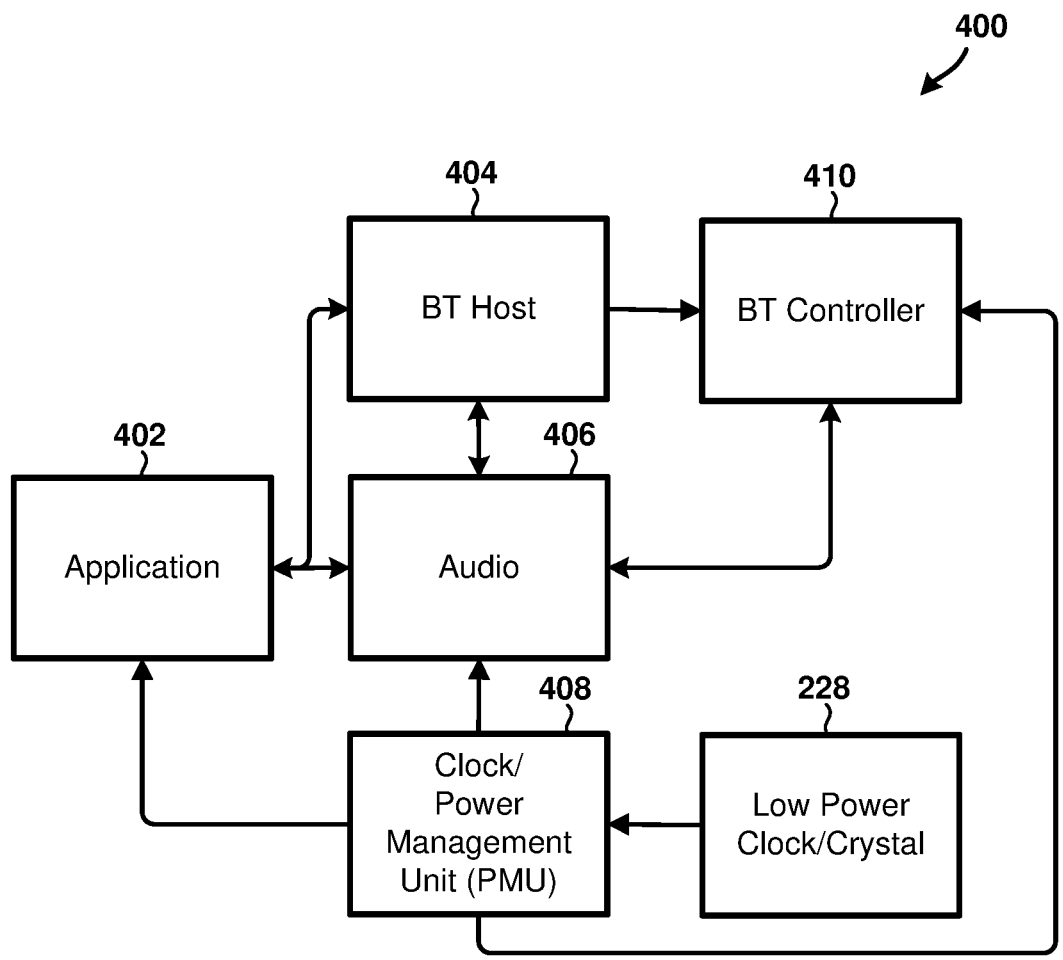

FIGS. 3 and 4 illustrate various operations and communications between components that could be included in a wireless device (e.g., earbud 102a, 102b, charging case 104) and/or a system 300, 400 configured in accordance with the various embodiments. With reference to FIGS. 1A-3, system 300 may include a battery 108a, 108b, I/O and USB component 212, a charging integrated circuit 302, LDO/SMPS components 220, a processor 304, a left earbud 102a, and a right earbud 102b. The processor 304 may include any or all of the processors 202-210 discussed in this application. The earbuds 102a, 102b may receive instructions and data communications from the processor 304. The earbuds 102a, 102b may receive electrical charge from the LDO/SMPS component 220b. The processor 304 may receive power from the LDO/SMPS component 220a of the charging case.

With reference to FIGS. 1A-4, system 400 may include an application component 402, a BT host component 404, an audio component 406, a clock/power management unit (PMU) component 408, a BT controller component 410, and low power clock/crystal component 228. In some embodiments, the clock/PMU component 408 may include the XTAL 226 component discussed above with reference to FIG. 2.

The application component 402 may request and receive BT services. The BT host component 404 may be included in charging case 104 (or smartphone, etc.) and configured to initiate a connection with the earbud 102a, 102b, perform the pairing and connection setup processes (including authentication, encryption, etc.), and/or manage the data transmission between the devices. The BT host component 404 may send data packets to the earbud 102a, 102b, which may include audio signals, commands, and other control signals. The BT host component 404 may also monitor the battery level of the earbud 102a, 102b, manage the process charging the earbuds 102a, 102b, and manage power consumption by controlling the power state of the Bluetooth radio in the earbuds 102a, 102b.

The BT controller component 410 may be included in the charging case 104 and configured to manage the radio frequency communications between the earbud 102a, 102b and the host device. The BT controller component 410 may manage the transmission and reception of data and may be responsible for implementing Bluetooth protocols and managing the connection. The BT controller component 410 may also include power management features, such as adjusting the transmission power to conserve battery life.

Figure 5:
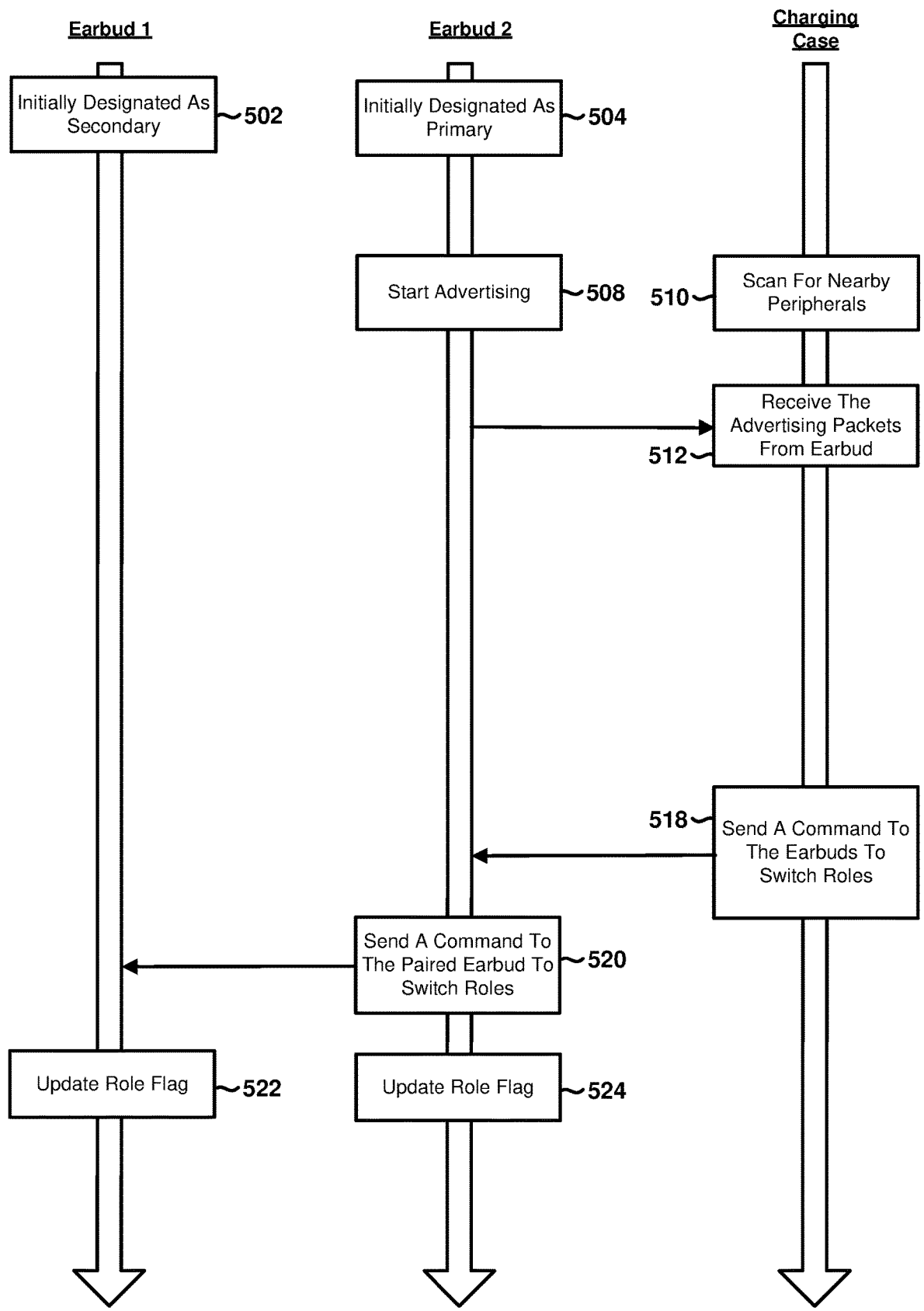
FIG. 5 is an activity diagram illustrating various components, operations, and communications in a Bluetooth system configured to switch roles in accordance with some embodiments.

FIG. 5 illustrates various components, operations, and communications in a system (e.g., system 100 illustrated in FIG. 1B, etc.) configured to switch roles in accordance with some embodiments. With reference to FIGS. 1A-5, in blocks 502 and 504, a first earbud (Earbud 1) may be initially designated to operate in a secondary wireless device role and a second earbud (Earbud 2) may be initially designated to operate in a primary wireless device role. As discussed above, earbuds may implement a dual-chip architecture that includes two separate ASOCs (one for each earbud), which may allow each earbud in the pair to operate as a primary (master) earbud that broadcasts the LE advertisements and/or conducts BT/BLE communications with other wireless devices.

Typically, only one of the earbuds in a pair of earbuds functions as the primary, while the other operates as the secondary. One earbud may be initially designated as the primary, and the other the secondary. In some embodiments, earbuds may coordinate and communicate with one another to determine the earbud that initially operates as the primary earbud and the earbud that initially operates as the secondary earbud.

In block 508, the second earbud (Earbud 2) operating in the primary wireless device role start advertising as peripherals. For example, the primary earbud (e.g., Earbud 2) may periodically send out advertising packets with its UUID and a "Role Flag" set to 0. In some embodiments, the secondary earbud (Earbud 1) may also send out advertising packets with its UUID and the Role Flag set to 1.

In block 510, the charging case 104 may scan for nearby peripherals and receive the advertising packets from the second earbud (Earbud 2) in block 512. In some embodiments, based on the UUIDs, the central device may identify both earbuds as being part of the same pair and determine the earbud that operates as the primary earbud and the earbud that operates as the secondary earbud. In block 518, the central device may send a command to the primary earbud (e.g., Earbud 2) to switch roles with the secondary earbud.

In block 520, the primary earbud (e.g., Earbud 2) may send a command to the paired earbud to switch roles. In blocks 522 and 524, the earbuds may perform various operations to switch roles, which may include toggling or updating the "Role Flag."

Figure 6:
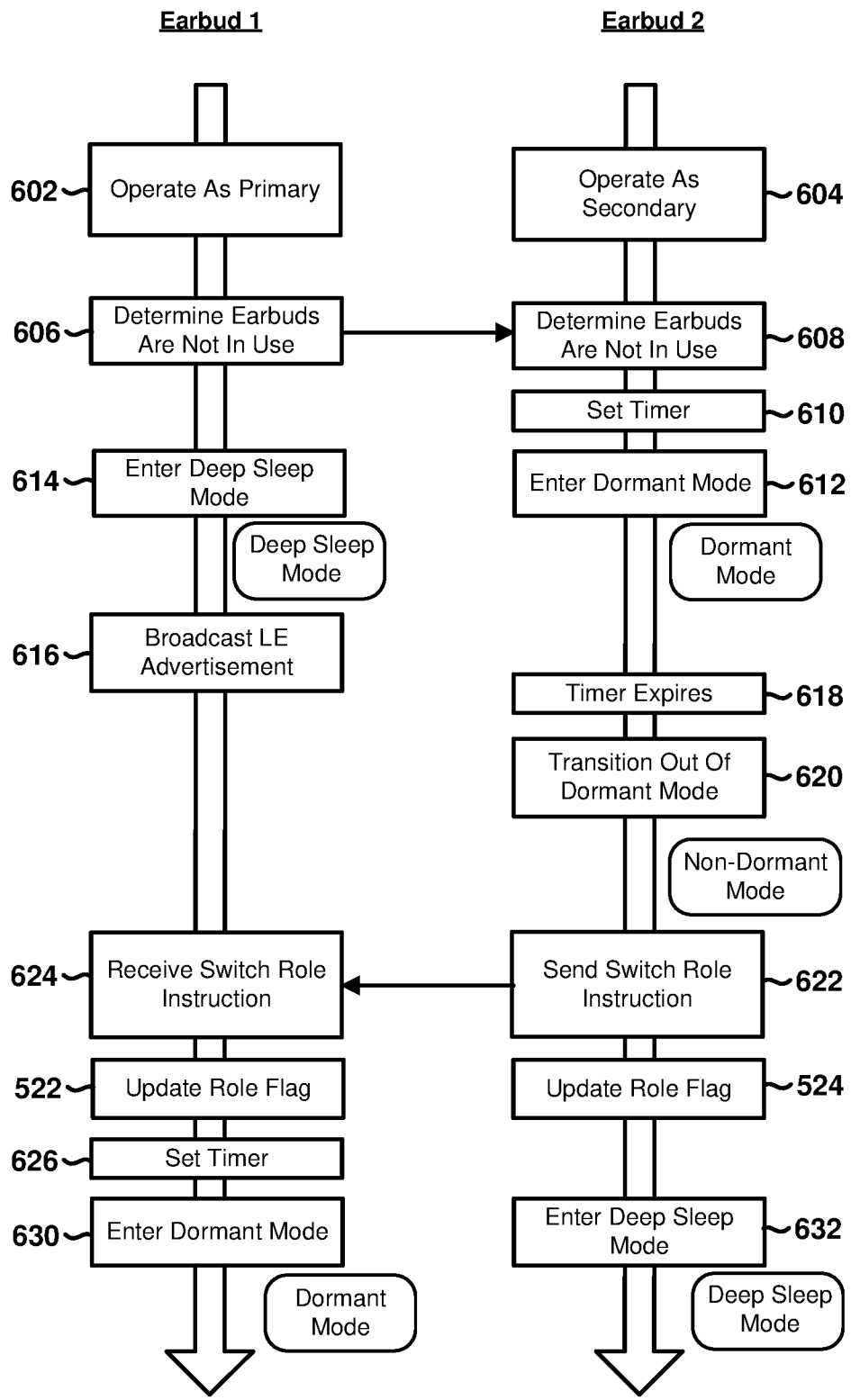
FIG. 6 is an activity diagram illustrating various components, operations, and communications in a system that includes earbuds configured to balance their battery cycles by switching roles based on time in accordance with some embodiments.

FIG. 6 illustrates various components, operations, and communications in a system that includes earbuds configured to balance their battery cycles by switching roles based on time in accordance with some embodiments. With reference to FIGS. 1A-6, in blocks 602 and 604, the first earbud (Earbud 1) may operate in the primary wireless device role and the second earbud (Earbud 2) may operate in the secondary wireless device role.

In blocks 606 and 608, one or both of the earbuds may determine that the earbuds are not in use. For example, in some embodiments, the primary earbud (Earbud 1) may determine that the earbuds have been placed in the charging case in block 606 and send a notification message to the secondary earbud (Earbud 2) to indicate that the earbuds are not in use. As discussed above, the earbuds may be configured to intelligently enter and exit the different power modes to balance tradeoffs between performance and power consumption. For example, the secondary earbud may enter dormant mode when it is not being used. The primary earbud may enter and operate in deep sleep mode when it is not being used so that it may continue to periodically broadcast LE advertisements.

In block 610 the secondary earbud (Earbud 2) may set a timer. As discussed above, the earbuds 102a, 102b (or ASOC 106) may include a low power clock/crystal component 228 that allows the secondary earbud to track time while in dormant mode. The earbuds 102a, 102b may be configured to set the timer when they enter the dormant mode, and to wake up in response to detecting the expiration of the timer to signal the current primary earbud to determine whether the secondary earbud should transition out of the dormant mode and into deep sleep mode, and start broadcasting advertisements. In some embodiments, the earbuds may be configured to coordinate and communicate to determine the length of the timer. In some embodiments, the earbuds may determine the length of the timer based on their respective battery levels and/or the battery differential index (BDI) value. The BDI value may identify the difference between the current battery levels or the difference between the current battery level of the primary earbud and the battery level of the secondary earbud when it went into dormant mode.

In block 612 the secondary earbud (Earbud 2) may enter dormant mode. As discussed above, the dormant mode may be a low-power mode that the earbuds 102a, 102b may enter when they are not being used but are still powered on. In dormant mode, the earbuds 102a, 102b consume very little power (e.g., 23 microamps, etc.) but may be awakened quickly to resume normal operation. The charging case 104 may be configured to not charge earbuds 102a, 102b that are in dormant mode (e.g., because it cannot communicate with them and could risk overcharging).

In block 614, the primary earbud (Earbud 1) may enter deep sleep mode. As mentioned above, the deep sleep mode may be a power-saving mode in which some of the subsystems are throttled or de-energized to reduce power consumption (e.g., to 210 microamps, etc.). In deep sleep mode, the major subsystems (e.g., the application processor 208, BT/BLE radio processor 206, etc.) remain active to provide select functionality, such as periodically broadcasting LE advertisements (which may increase power consumption to 320 microamps for the duration of the broadcast). The charging case 104 may be configured to charge earbuds 102a, 102b that are in deep sleep mode.

In block 616, the primary earbud (Earbud 1) may commence broadcasting LE advertisements. As discussed above, always-on LE advertising is a type of BLE advertisement that may be used to broadcast presence, availability, capability, and battery life information for reception by other computing devices. LE advertising allows BLE devices to broadcast advertising data periodically, continuously, or at nearly all times, even when they are not actively in use, in a charging case, or operating in a low-power state. Many platforms and applications use this advertisement feature to provide context-aware features and services (e.g., FindMy, etc.). Since the LE advertisements consume power, the battery 108a, 108b of the earbud 102a, 102b operating as the primary may drain faster than the battery 108a, 108b of the earbud 102a, 102b operating as the secondary. As such, in some embodiments, the earbuds 102a, 102b may be configured to alternate roles as primary/secondary so that the primary earbud does not consume all of its battery resources while the battery resources of the secondary remain underutilized. By periodically switching between primary and secondary roles, the earbuds 102a, 102b may balance the battery cycle to prolong the battery life of their respective batteries 108a, 108b. Balancing the battery cycle may include managing the battery charging and discharging cycles so that the batteries 108a, 108b in the earbuds 102a, 102b are charged and discharged evenly, receive equal amounts of power or charge, are used in a balanced manner, preventing one battery from being overcharged while the other is undercharged, and/or preventing one battery from being overused while the other is underutilized.

In blocks 618 and 620, the secondary earbud (Earbud 2) may detect the expiration of the timer (e.g., via the low power clock/crystal component 228, etc.) and transition out of the dormant mode into a non-dormant mode, which may be an active mode or the deep sleep mode or another mode in which the earbud may send and receive information. As discussed above, as part of the operations for switching roles, the earbud 102a, 102b set a timer and/or periodically measure the battery level of the earbud. Once the timer and/or battery level reaches a threshold value, the current primary earbud may put itself into dormant mode and/or cause the current second earbud to exit the dormant mode and commence operating as the new primary earbud. The earbuds may keep alternating the primary and secondary roles until the batteries are fully charged or fully discharged, or until some charge threshold is reached (e.g., 95% of max, etc.).

In block 622, the secondary earbud (Earbud 2) may send a switch role instruction to the primary earbud (Earbud 1). The switch role instruction may be a signal or flag that notifies the paired earbud that they should transition roles. In this example, it is sent after the expiration of the timer so that the earbuds may alternate roles based on time.

In block 624, the primary earbud (Earbud 1) may receive the switch role instruction. In blocks 522 and 524, the earbuds may update their respective role flags. In blocks 626 and 630, the primary earbud (Earbud 1) may set the timer and transition from operating in deep sleep mode to operating in dormant mode. In some embodiments, the earbuds may collaborate and communicate to determine the duration of the timer. In some embodiments, the earbuds may determine the duration of the timer based on their battery levels (e.g., DPI, etc.). In block 632, the secondary earbud (Earbud 2) may transition from operating in dormant mode to operating in deep sleep mode. After the transition, Earbud 2 may commence operating as the primary earbud, commence broadcasting LE advertisements, and/or commerce charging its battery.

Figure 7:
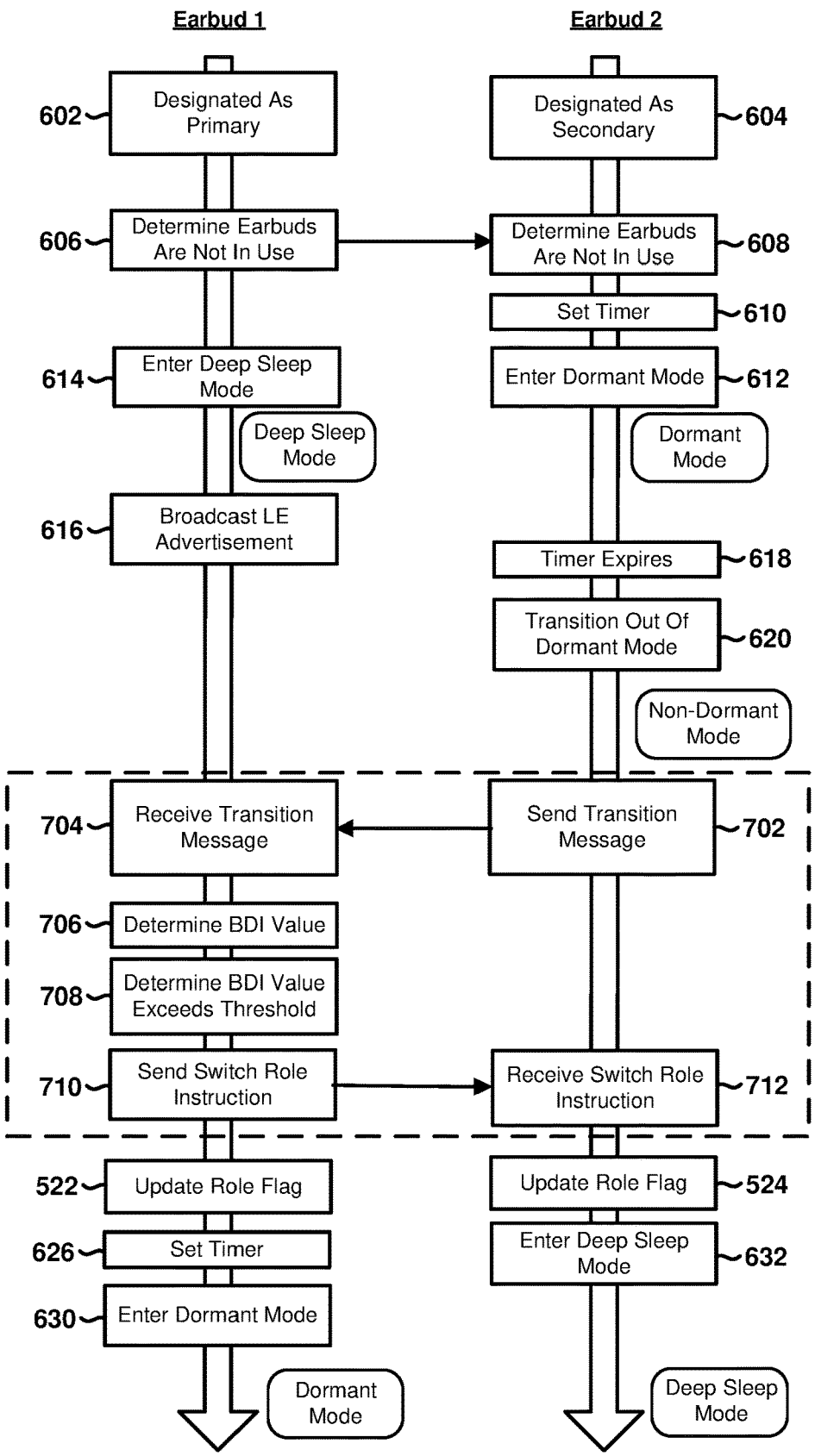
FIG. 7 is an activity diagram illustrating various components, operations, and communications in a system that includes earbuds configured to balance their battery cycles by switching roles based on a difference in battery levels in accordance with some embodiments.

FIG. 7 illustrates various components, operations, and communications in a system that includes earbuds configured to balance their battery cycles by switching roles based on a difference in battery levels in accordance with some embodiments. With reference to FIGS. 1A-7, in blocks 602-620, the earbuds (Earbud 1, Earbud 2) may perform the operation discussed above.

In block 702, the secondary earbud (Earbud 2) may send a transition message to the primary earbud (Earbud 1) indicating that the secondary earbud (Earbud 2) has transitioned from operating in the dormant mode to operating in a deep sleep mode and periodically broadcasting an advertisement. In block 704, the primary earbud (Earbud 1) may receive the transition message indicating that the paired device (Earbud 2) has activated its processing and/or communications circuitry and is ready to receive instructions and commands.

In block 706, the primary earbud (Earbud 1) may determine a battery differential index (BDI) value based on a difference between its current battery level and the battery level of the paired secondary earbud (Earbud 2). In block 708, the primary earbud (Earbud 1) may determine whether the BDI value exceeds a battery threshold value. As discussed above, the battery threshold value may be determined so that it is less than the battery level of a paired or secondary earbud when it went into dormant mode and/or so that it is within a predefined limit (e.g., 5%, etc.) of the battery level of the paired/secondary earbud.

In block 710, the primary earbud (Earbud 1) may send a switch role instruction to the secondary earbud (Earbud 2) indicating that the secondary earbud (Earbud 2) should switch from operating in the dormant mode to operating in the deep sleep mode and periodically broadcasting LE advertisements.

In block 712, the secondary earbud (Earbud 2) may receive the switch role instruction indicating that the secondary earbud (Earbud 2) should switch from operating in the dormant mode to operating in the deep sleep mode and periodically broadcasting LE advertisements. In blocks 522, 524, and 626-632, may perform the operation discussed above with reference to FIG. 6.

Figure 8A:
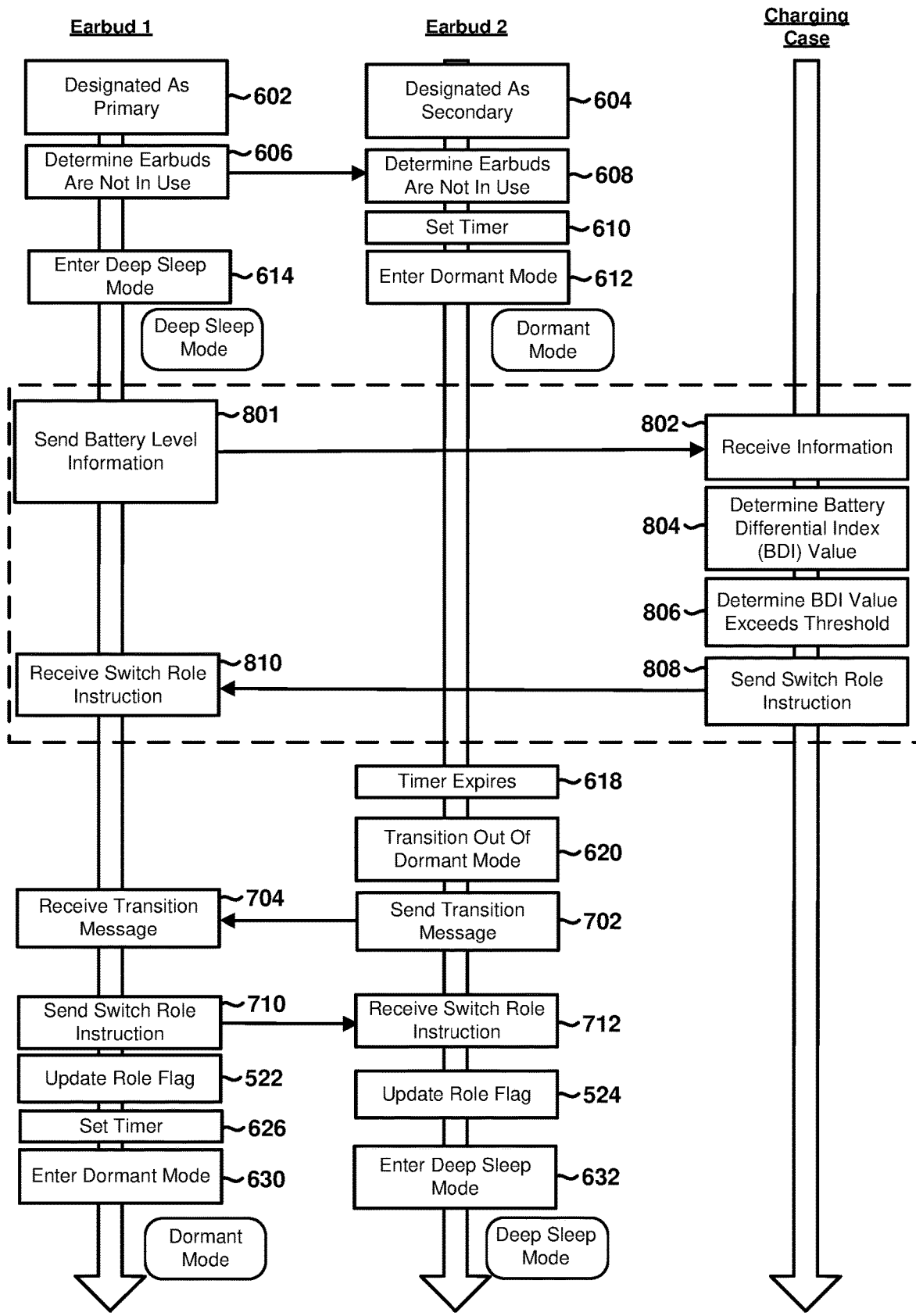
FIGS. 8A and 8B are activity diagrams illustrating various components, operations, and communications in a system that includes a charging case configured to balance the battery cycles of a pair of earbuds in accordance with some embodiments.

FIG. 8A illustrates various components, operations, and communications in a system that includes a charging case (e.g., charging case 104) configured to balance earbud battery cycles in accordance with some embodiments. With reference to FIGS. 1A-8A, in blocks 602-614, the earbuds (Earbud 1, Earbud 2) may perform the operation discussed above with reference to FIGS. 5-7. In block 801, the primary earbud (Earbud 1) may send battery level information to the charging case. In some embodiments, in block 801, the primary earbud (Earbud 1) may send the battery level information to the charging case via a wired connection or physical pins (e.g., pogo pins, etc.). In some embodiments, in block 801, the primary earbud (Earbud 1) may include battery level information in an LE broadcast advertisements. For example, if the current battery level of the primary earbud is 95%, it may include that in the LE advertisement message.

In block 802, the charging case may receive the battery level information from the primary earbud (Earbud 1) operating in deep sleep mode. In some embodiments, in block 802, the charging case may receive an LE broadcast advertisement that includes battery level information from the primary earbud (Earbud 1) operating in deep sleep mode.

In block 804, the charging case may determine a battery differential index (BDI) value based on a difference between a battery level of the primary earbud (Earbud 1) and a battery level of the paired secondary earbud (Earbud 2).

In block 806, the charging case may determine that the BDI value exceeds a battery threshold value. As discussed above, the battery threshold value may be determined so that it is less than the battery level of a paired or secondary earbud when it went into dormant mode and/or so that it is within a predefined limit (e.g., 5%, etc.) of the battery level of the paired/secondary earbud.

In block 808, the charging case may send a switch role instruction message to the primary earbud (Earbud 1) indicating the earbud should switch roles with the paired earbud (Earbud 2) based on the BDI value exceeding a battery threshold value.

In block 810, the primary earbud (Earbud 1) may receive the switch role instruction message from the charging case. In blocks 618, 620, 702, 704, 710, 712, 522, 524, 626, 630 and 632, the earbuds (Earbud 1, Earbud 2) may perform the operation discussed above with reference to FIGS. 5-7.

Figure 8B:
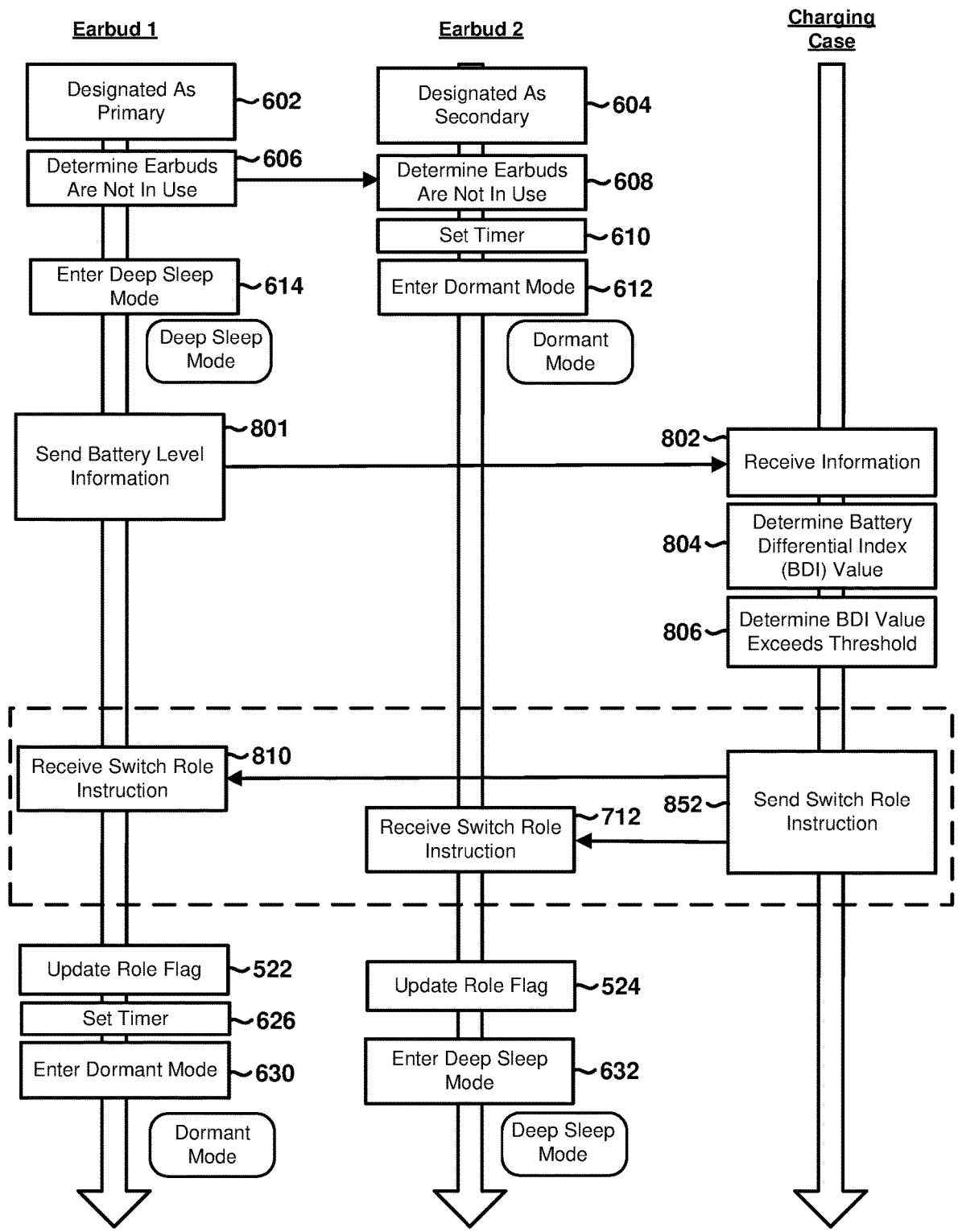

FIG. 8B illustrates various components, operations, and communications in a system that includes a charging case (e.g., charging case 104) configured to balance earbud battery cycles in accordance with some embodiments. With reference to FIGS. 1A-8B, in blocks 602-614 and 801-806 the earbuds (Earbud 1, Earbud 2) and charging case may perform the operations described with reference to FIGS. 5-8A. In block 852, the charging case may send a switch role instruction message to both the primary earbud (Earbud 1) and the paired earbud (Earbud 2) instructing them to switch roles based on the BDI value exceeding a battery threshold value. In blocks 810, 712, 522, 524, 626, 630 and 632, the earbuds (Earbud 1, Earbud 2) may perform the operation described with reference to FIGS. 5-8A.

Figure 9:
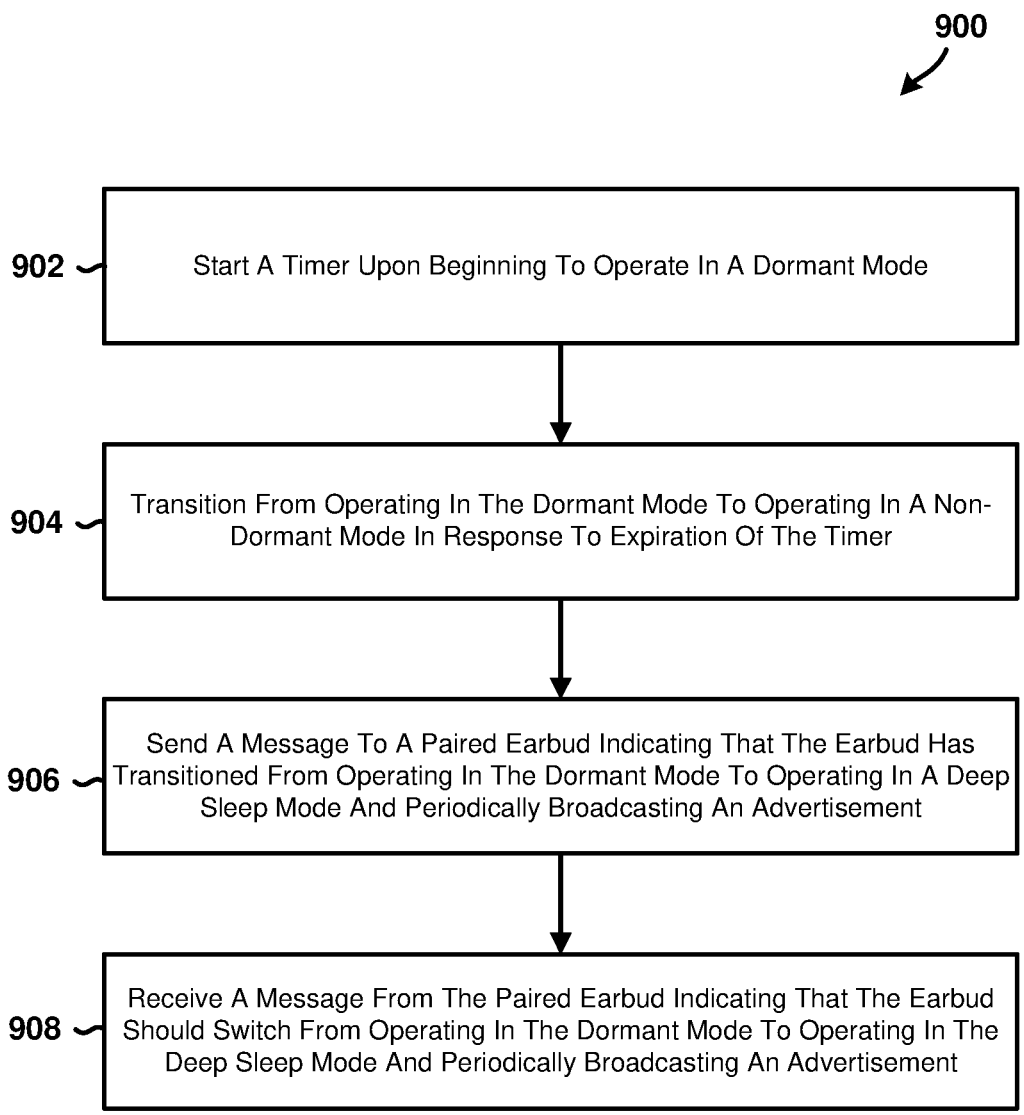
FIGS. 9-13 are process flow diagrams illustrating methods of balancing battery cycles in accordance with various embodiments.

FIG. 9 illustrates a method 900 of balancing battery cycles in accordance with some embodiments. Method 900 may be performed by a processor (e.g., ASOC 106a, 106b, 202-210, etc.) of an earbud 102a, 102b. With reference to FIGS. 1-9, means for performing functions of the method 900 may include a processor (e.g., ASOC 106a, 106b, 202-210, etc.) in an earbud.

In block 902, the processor may start a timer upon beginning to operate in a dormant mode. As mentioned above, the earbuds 102a, 102b may be equipped with timer hardware (e.g., low power clock/crystal component 228 illustrated in FIG. 2) that allows the earbud to track time while in dormant mode. The processor may configure the clock or crystal to generate a periodic interrupt signal (e.g., by setting up an interrupt request handler, etc.) at a predetermined or dynamically determined interval, which may then be used as a timer.

In block 904, the processor may transition from operating in the dormant mode to operating in a non-dormant mode in response to the expiration of the timer. The dormant mode may be a low-power mode that the earbuds 102a, 102b may enter when they are not being used but are still powered on. In dormant mode, the earbuds 102a, 102b consume very little power (e.g., 23 microamps, etc.) but may be awakened quickly to resume normal operation. In some embodiments, the earbuds 102a, 102b may be configured to set a timer when they enter the dormant mode, and to wake up in response to detecting the expiration of the timer to determine whether to switch roles with the primary earbud. In some embodiments, the operations for transition from operating in the dormant mode to operating in a non-dormant mode may include booting the chip, performing radio calibration, batch loading, and other similar operations.

In block 906, the processor may send a message to a paired earbud indicating that the earbud has transitioned from operating in the dormant mode to operating in a deep sleep mode and periodically broadcasting an advertisement. For example, as discussed above with reference to block 702, the earbud may send a transition message to an earbud operating in a primary role indicating that the earbud has transitioned from operating in the dormant mode to operating in non-dormant mode, and thus may now receive instructions and communications from the paired earbud or a charging case.

In some embodiments, sending the message to the paired earbud in block 906 may cause the paired earbud to determine a battery differential index (BDI) value and determine whether the BDI value exceeds a battery threshold value. In some embodiments, the paired earbud may be configured to determine the battery threshold value so that it is less than the battery level of the earbud when it entered dormant mode and/or so that it is within a predefined limit (e.g., 5%, etc.) of the battery level of the earbud.

In some embodiments, the charger case may determine whether the BDI value exceeds a battery threshold value, and send a switch role message to the paired earbud. Sending the message to the paired earbud in block 906 may cause the paired earbud to determine whether it received a switch role message from the charging case prior to receiving the message from the earbud.

In block 908, the processor may receive a message from the paired earbud indicating that the earbud should switch from operating in the dormant mode to operating in deep sleep mode and periodically broadcasting an advertisement. For example, as discussed with reference to blocks 710 and 712, the earbud may receive a switch role instruction from the paired earbud indicating that the earbud should switch from operating in the dormant mode to operating in the deep sleep mode and periodically broadcasting LE advertisements. In some embodiments, the paired earbud may be configured to send the message indicating that the earbud should switch from operating in the dormant mode to operating in deep sleep mode in response to determining that the paired earbud received a switch role message from the charging case prior to receiving the message from the earbud.

Figure 10:
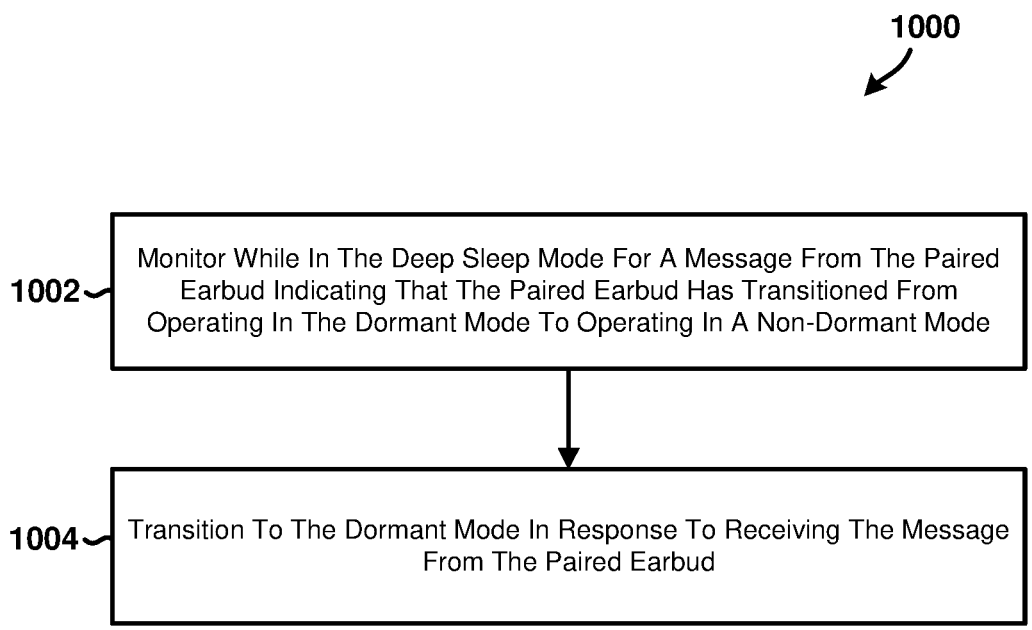

FIG. 10 illustrates a method 1000 of balancing battery cycles in accordance with some embodiments. Method 1000 may be performed by a processor (e.g., ASOC 106a, 106b, 202-210, etc.) of an earbud 102a, 102b. With reference to FIGS. 1-10, means for performing functions of the method 1000 may include a processor (e.g., ASOC 106a, 106b, 202-210, etc.) in an earbud.

In block 1002, the processor may monitor while in deep sleep mode for a message from the paired earbud indicating that the paired earbud has transitioned from operating in the dormant mode to operating in a non-dormant mode. While the processor is in deep sleep mode, it may perform any or all of the operations discussed above, such as broadcasting presence, availability, capability, and battery life information for reception by other computing devices (e.g., charging case, smartphone, etc.).

In block 1004, the processor may transition to dormant mode in response to receiving the message from the paired earbud. For example, as discussed above with reference to blocks 622-630, the message from the paired earbud may be sent after the expiration of the timer so that the earbuds may alternate roles based on time, and may include a switch role instruction that notifies the earbud that it should transition roles. The earbud may update its role flag, set a timer, and transition from operating in deep sleep mode to operating in dormant mode. In some embodiments, the earbuds may collaborate and communicate to determine the duration of the timer (e.g., based on their battery levels, etc.).

Thus, in some embodiments, the processor may determine whether to cause the earbud to transition roles and/or power modes based on time. In some embodiments, the processor may determine whether to cause the earbud to transition roles and/or power modes based on a battery differential index (BDI) value that identifies a difference between the battery level of the first earbud and the battery level of the second earbud when it went into dormant mode. In some embodiments, the processor may determine whether to cause the earbud to transition roles and/or power modes based on information or transition instructions received from the charging case.

Figure 11:
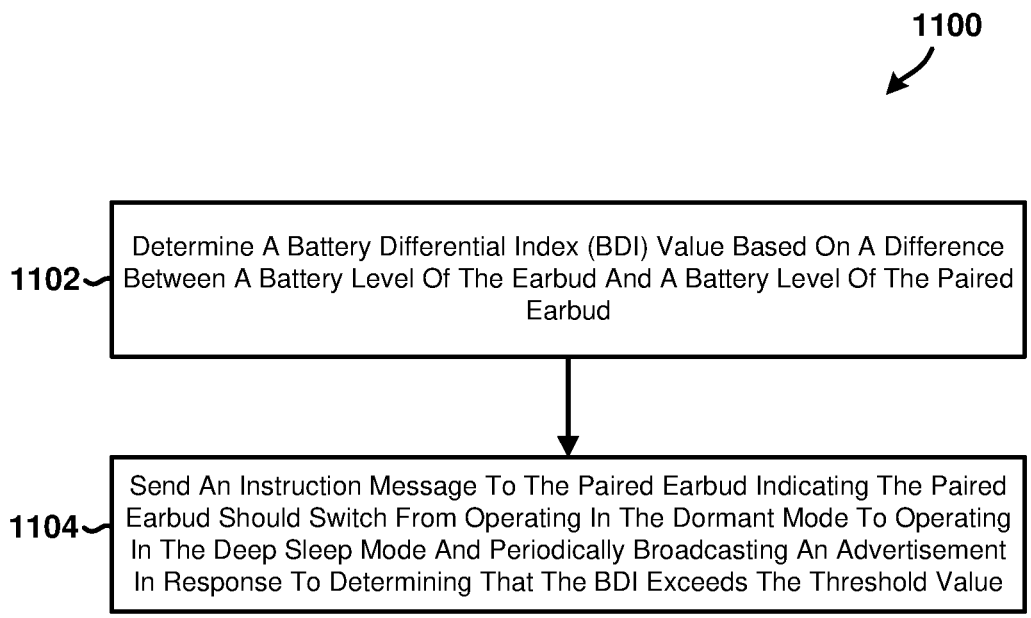

FIG. 11 illustrates a method 1100 of balancing battery cycles in accordance with some embodiments. Method 1100 may be performed by a processor (e.g., ASOC 106a, 106b, 202-210, etc.) of an earbud 102a, 102b. With reference to FIGS. 1-11, means for performing functions of the method 1100 may include a processor (e.g., ASOC 106a, 106b, 202-210, etc.) in an earbud.

In block 1102, the processor may monitor while in deep sleep mode for a message from the paired earbud indicating that the paired earbud has transitioned from operating in the dormant mode to operating in a non-dormant mode. For example, as described above with reference to blocks 702 and 704, the earbud may receive a transition message indicating that the paired earbud has transitioned from operating in the dormant mode to operating in a deep sleep mode, and thus has activated its processing and/or communications circuitry and is ready to receive instructions and commands.

In block 1104, the processor may send an instruction message to the paired earbud indicating the paired earbud should switch from operating in the dormant mode to operating in the deep sleep mode and periodically broadcasting an advertisement in response to determining that the BDI exceeds the threshold value. For example, as described above with reference to blocks 706-712, the earbud may determine a battery differential index (BDI) value based on a difference between its current battery level and the battery level of the paired secondary earbud, determine whether the BDI value exceeds a battery threshold value, and send a switch role instruction to the paired earbud indicating that the paired earbud should switch from operating in the dormant mode to operating in the deep sleep mode and periodically broadcasting LE advertisements. As also discussed above, the battery threshold value may be determined so that it is less than the battery level of a paired or secondary earbud when it went into dormant mode and/or so that it is within a predefined limit (e.g., 5%, etc.) of the battery level of the paired/secondary earbud.

Figure 12:
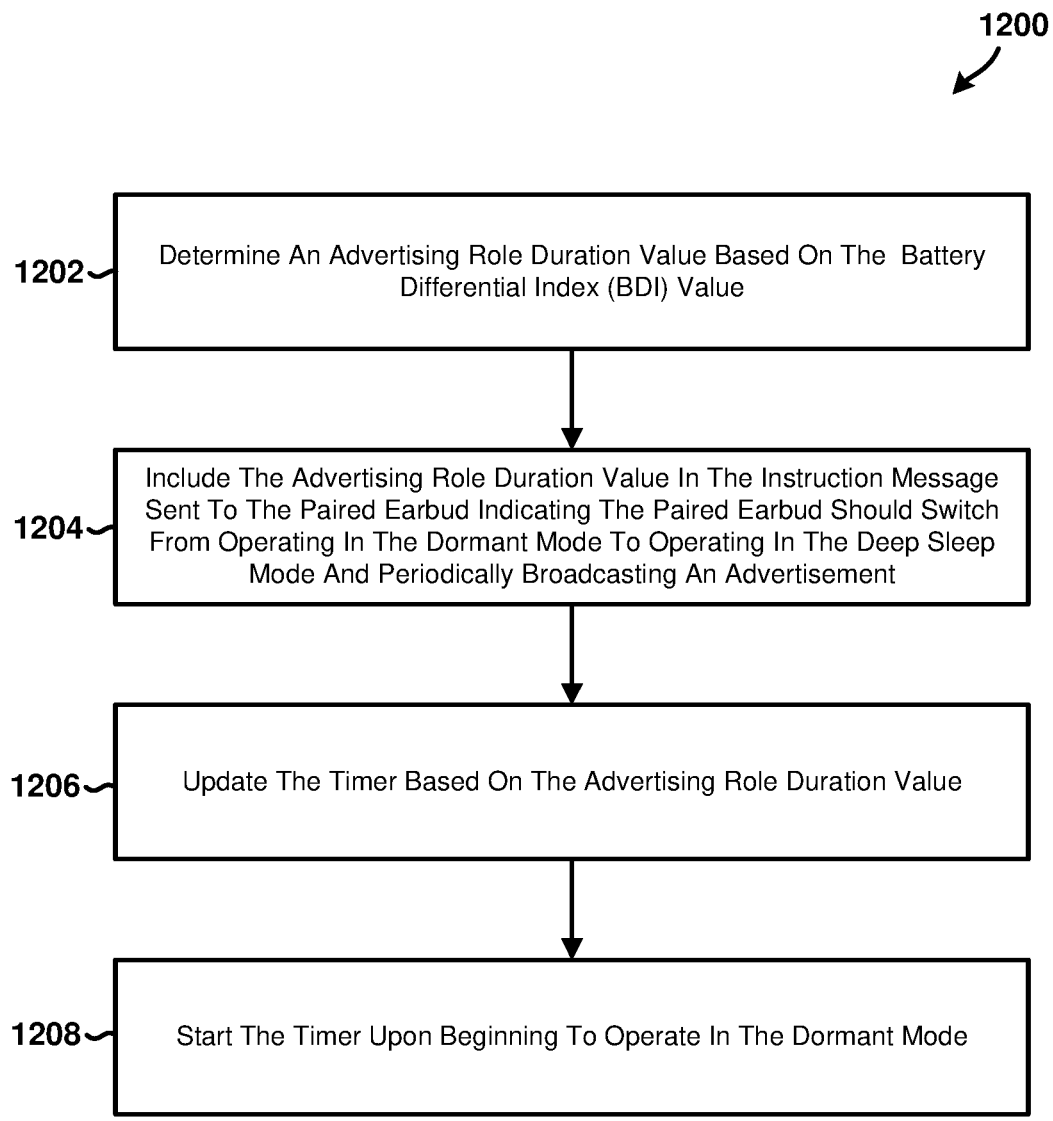

FIG. 12 illustrates a method 1200 of balancing battery cycles in accordance with some embodiments. Method 1200 may be performed by a processor (e.g., ASOC 106a, 106b, 202-210, etc.) of an earbud 102a, 102b. With reference to FIGS. 1-12, means for performing functions of the method 1200 may include a processor (e.g., ASOC 106a, 106b, 202-210, etc.) in an earbud.

In block 1202, the processor may determine an advertising role duration value based on the battery differential index (BDI) value. The advertising role duration value may be a time value that is determined based on the BDI value or current battery level (e.g., 80%, 90%, 95%) of the earbud. The BDI value may be a value that identifies the difference between the current battery level of the earbud and the battery level of the paired earbud when the paired earbud entered into dormant mode.

In block 1204, the processor may include the advertising role duration value in the instruction message sent to the paired earbud indicating the paired earbud should switch from operating in the dormant mode to operating in the deep sleep mode and periodically broadcasting an advertisement.

In block 1206, the processor may update the timer based on the advertising role duration value. The advertising role duration value may be a configurable parameter that indicates how long the earbud should remain in dormant mode before switching to a non-dormant role. Updating the timer may include changing the duration of the timer to match the new advertising role duration value.

In block 1208, the processor may start the timer upon beginning to operate in the dormant mode. That is, a processor or earbud may enter the dormant mode to conserve power when it is not actively processing data or interacting with peripherals. While in the dormant mode, the processor may still need to perform certain tasks, such as waking up periodically to check to determine whether it should switch roles. To accomplish this, the processor may start a timer upon entering the dormant mode. The timer may be configured to generate periodic interrupts at a specified interval, which may be used to wake up the processor and execute the necessary code. The timer may use a low-power clock or crystal to reduce or minimize power consumption. When the timer expires and generates an interrupt, it may execute code, update the system state, and return the earbud to dormant mode to conserve power until the next wake-up event occurs.

Figure 13:
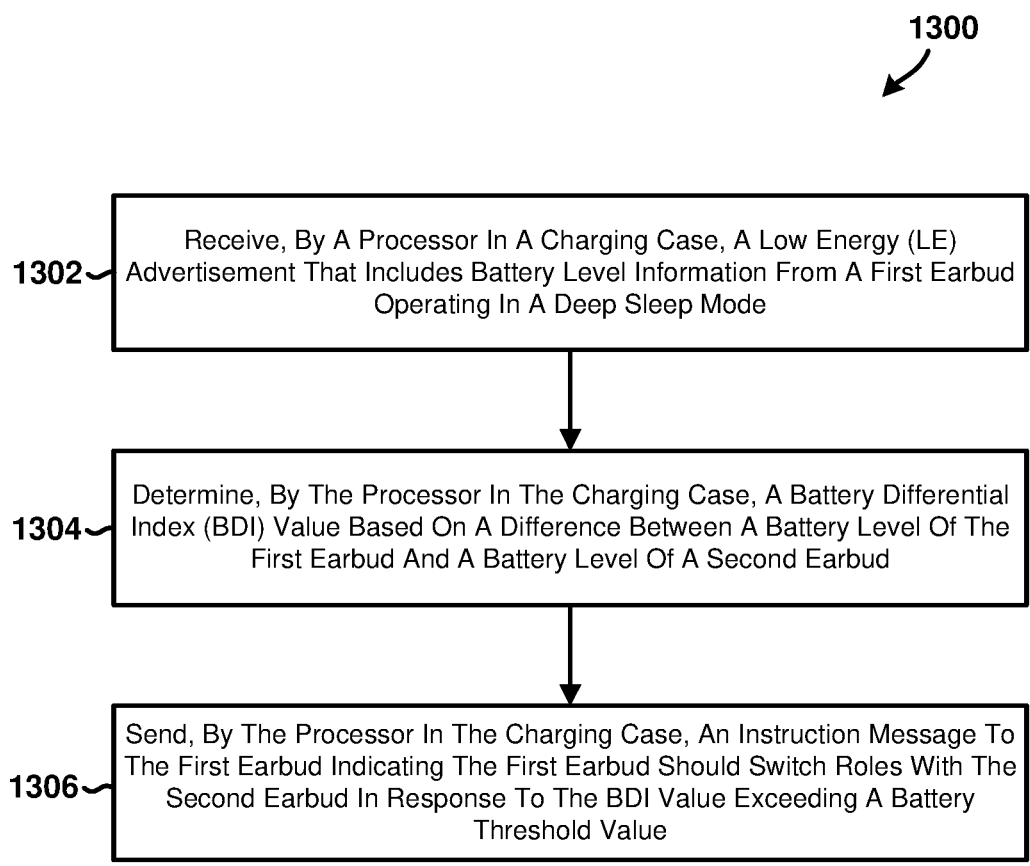

FIG. 13 illustrates a method 1300 of balancing battery cycles between a first earbud and a second earbud in a charging case in accordance with some embodiments. Method 1300 may be performed by a processor (e.g., ASOC 106a, 106b, 202-210, etc.) of a charging case 104. With reference to FIGS. 1-13, means for performing functions of the method 1300 may include a processor (e.g., ASOC 106a, 106b, 202-210, etc.) in a charging case.

In block 1302, the processor in the charging case may receive a low energy (LE) advertisement that includes battery level information from a first earbud operating in a deep sleep mode. As discussed above, always-on LE advertising is a type of BLE advertisement that may be used to broadcast presence, availability, capability, and battery life information for reception by other computing devices. LE advertising allows BLE devices to broadcast advertising data periodically, continuously, or at nearly all times, even when they are not actively in use, in a charging case, or operating in a low-power state. Many platforms and applications use this advertisement feature to provide context-aware features and services (e.g., FindMy, etc.). Since the LE advertisements consume power, the battery 108a, 108b of the earbud 102a, 102b operating as the primary may drain faster than the battery 108a, 108b of the earbud 102a, 102b operating as the secondary. As such, in some embodiments, the processor in the charging case may cause the earbuds 102a, 102b to alternate roles as primary/secondary so that the primary earbud does not consume all of its battery resources while the battery resources of the secondary remain underutilized. By periodically switching between primary and secondary roles, the processor in the charging case 104 may balance the battery cycles of the two earbuds to prolong the battery life of each. Balancing the battery cycles of the two earbuds may include managing the battery charging and discharging cycles of the two earbuds so that the batteries 108a, 108b in the two earbuds 102a, 102b are charged and discharged evenly, receive equal amounts of power or charge, are used in a balanced manner, preventing one battery from being overcharged while the other is undercharged, and/or preventing one battery from being overused while the other is underutilized.

In block 1304, the processor in the charging case may determine a battery differential index (BDI) value based on a difference between a battery level of a first earbud and a battery level of a second earbud. As discussed above with reference to blocks 802-810, the BDI value may identify a difference between the battery level of the first earbud and the battery level of the second earbud when it went into dormant mode.

In block 1306, the processor in the charging case may send an instruction message to the first earbud indicating the first earbud should switch roles with the second earbud in response to the BDI value exceeding a battery threshold value. That is, the processor in the charging case may send an instruction message to one or both of the first and/or second earbuds indicating the earbuds should switch roles in response to the BDI value exceeding a battery threshold value. The battery threshold value may be determined by the processor in the charging case so that it is less than the battery level of a second earbud when it went into dormant mode and/or so that it is within a predefined limit (e.g., 5%, etc.) of the battery level of the second earbud.

Some embodiments may include an earbud that includes a timer and a processor configured to operate in an active mode, a deep sleep mode, and a dormant mode. The timer may be configured to determine how long the earbud has been in the dormant mode and trigger the transition from the dormant mode to the deep sleep mode. The earbud may be configured to remain in the dormant mode for the period of the timer and then exit to a non-dormant mode (e.g., deep sleep mode, active mode, etc.) and communicate with the other earbud that it is ready to assume the advertising role. The earbud may enter the deep sleep mode, begin advertising, and await communication from the other earbud.

Some embodiments may include methods of balancing battery cycles of a pair of wireless devices that include a processing device (e.g., ASOC 106a, 106b in a charging case, earbud, etc.) identifying a wireless device in the pair of wireless devices that is in a deep sleep mode, operating in a primary wireless device role, and which broadcasts LE advertisements, and causing the wireless device to switch to operating in a secondary wireless device role in response to detecting expiration of a timer or in response to determining that a difference between a battery level of the wireless device and a battery level of the other wireless device in the pair of wireless devices exceeds a threshold value.

Some embodiments may include methods of balancing battery cycles of a pair of wireless devices that include a processing device (e.g., ASOC 106a, 106b in a charging case, earbud, etc.) identifying a first wireless device in the pair of wireless devices that is operating in a primary wireless device role, in a deep sleep mode, and broadcasting LE advertisements, identifying a second wireless device in the pair of wireless devices operating in a secondary wireless device role and in a dormant mode, determining a battery differential index (BDI) based on a difference between a battery level of the first wireless device and a battery level of the second wireless device, determining whether the BDI exceeds a threshold value, and causing the first wireless device and the second wireless device to switch roles (primary and secondary) in response to determining that the BDI exceeds the threshold value.

In some embodiments, the operations for switching roles may include transitioning the first wireless device from the deep sleep mode to the dormant mode, and transitioning the second wireless device from the dormant mode to the deep sleep mode.

In some embodiments, the operations for switching roles may include detecting timer expiration in the second wireless device operating in the secondary wireless device role, transitioning the second wireless device from the dormant mode to the deep sleep mode in response to detecting the timer expiration, transmitting information identifying the battery level of the second wireless device (e.g., to the primary earbud, charging case, etc.), receiving role-switching information (e.g., from the primary earbud, charging case, etc.) in response to transmitting the information identifying the battery level of the second wireless device, and determining whether to transition the second wireless device from operating secondary wireless device role to the primary wireless device role based on the received role-switching information.

Some embodiments may include methods of balancing battery cycles of a pair of wireless devices that include a processing device (e.g., ASOC 106a, 106b in a charging case, earbud, etc.) determining a battery differential index (BDI) based on a difference between a battery level of a first wireless device in the pair of wireless devices and a battery level of the second wireless device in the pair of wireless devices, determining whether the BDI exceeds a threshold value, causing the first wireless device and the second wireless device to switch operating in the primary and secondary wireless device roles in response to determining that the BDI exceeds the threshold value.

Some embodiments may include methods of balancing battery cycles of a pair of wireless devices that include a processing device (e.g., ASOC 106a, 106b in a charging case, earbud, etc.) causing a first wireless device in the pair of wireless devices that is operating in a primary role to switch roles with a second wireless device in the pair of wireless devices based on whether a difference between a battery level of the first wireless device and a battery level of the second wireless device exceeds a threshold value. In some embodiments, the method may include detecting, in the second wireless device, a timer expiration, transitioning the second wireless device from the dormant mode to a deep sleep mode in response to detecting the timer expiration, transmitting information identifying the battery level of the second wireless device, receiving role-switching information in response to transmitting the information identifying the battery level of the second wireless device, and determining whether to transition the second wireless device from operating in a secondary role to operating in a primary role based on the received role-switching information.

Some embodiments may include methods of balancing battery cycles of a pair of wireless devices that include causing a first wireless device in the pair of wireless devices that is operating in a primary role to switch roles with a second wireless device in the pair of wireless devices after a time period. In some embodiments, the method may further include detecting, in the second wireless device, a timer expiration, transitioning the second wireless device from the dormant mode to a deep sleep mode in response to detecting the timer expiration, receiving role-switching information indicating whether the second wireless device should transition from operating in a secondary role to the primary role, transitioning from operating in a secondary role to the primary role in response to determining that the role-switching information indicates that the second wireless device should transition from operating in the secondary role to operating in the primary role, and resetting the timer and re-entering the dormant mode in response to determining that the role-switching information does not indicate that the second wireless device should transition from operating in the secondary role to operating in the primary role.

Implementation examples are described in the following paragraphs. While the following implementation examples are described in terms of example methods, further example implementations may include: the example methods discussed in the following paragraphs implemented in a wireless device (e.g., earbud, charging case, etc.) including a processor configured to perform operations of the example methods; the example methods discussed in the following paragraphs implemented by a wireless device (e.g., earbud, charging case, etc.) including means for performing functions of the example methods; and the example methods discussed in the following paragraphs implemented as a non-transitory processor-readable storage medium having stored thereon processor-executable instructions configured to cause a processor of a wireless device (e.g., earbud, charging case, etc.) to perform the operations of the example methods.

Example 1

A method of balancing a battery cycle of an earbud, the method including starting, by a processor in the earbud, a timer upon beginning to operate in a dormant mode, transitioning from operating in the dormant mode to operating in a non-dormant mode in response to expiration of the timer, sending a message to a paired earbud indicating that the earbud has transitioned from operating in the dormant mode to operating in a deep sleep mode and periodically broadcasting an advertisement, and receiving a message from the paired earbud indicating that the earbud should switch from operating in the dormant mode to operating in the deep sleep mode and periodically broadcasting the advertisement.

Example 2

The method of example 1, further including monitoring while in the deep sleep mode for the message from the paired earbud indicating that the paired earbud has transitioned from operating in the dormant mode to operating in the non-dormant mode, and transitioning to the dormant mode in response to receiving the message from the paired earbud.

Example 3

The method of any of the examples 1 and 2, further including adding battery level information in broadcast advertisements.

Example 4

The method of any of the examples 1-3, further including determining a battery differential index (BDI) value based on a difference between a battery level of the earbud and a battery level of the paired earbud, and sending an instruction message to the paired earbud indicating the paired earbud should switch from operating in the dormant mode to operating in the deep sleep mode and periodically broadcasting the advertisement in response to determining that the BDI exceeds a battery threshold value.

Example 5

The method of example 4, further including determining an advertising role duration value based on the BDI, including the advertising role duration value in the instruction message sent to the paired earbud indicating the paired earbud should switch from operating in the dormant mode to operating in the deep sleep mode and periodically broadcasting the advertisement, updating the timer based on the advertising role duration value, and starting the timer upon beginning to operate in the dormant mode.

Example 6

A method of balancing battery cycles of earbuds in a charging case, the method including receiving, by a processor in the charging case, battery level information from a first earbud operating in a deep sleep mode, determining, by the processor in the charging case, a battery differential index (BDI) value based on a difference between a battery level of the first earbud and a battery level of a second earbud, and sending, by the processor in the charging case, an instruction message to the first earbud indicating the first earbud should switch roles with the second earbud in response to the BDI value exceeding a battery threshold value.

Example 7

The method of example 6, further including receiving, by the processor in the charging case, battery level information from the first earbud operating in the deep sleep mode via a wired connection or physical pin.

Example 8

The method of any of the examples 6 and 7, further including receiving, by the processor in the charging case, battery level information from the first earbud operating in the deep sleep mode by receiving a low energy (LE) advertisement that includes the battery level information from the first earbud operating in the deep sleep mode.

Example 9

The method of any of the examples 6-8, further including computing, by the processor in the charging case, the battery threshold value based on a battery level of the second earbud when the second earbud entered a dormant mode.

Example 10

The method of example 9, further including computing, by the processor in the charging case, the battery threshold value such that the battery threshold value is less than the battery level of the second earbud when the second earbud entered the dormant mode.

Example 11

The method of any of the examples 9 or 10, further including computing, by the processor in the charging case, the battery threshold value such that the battery threshold value is a percentage value that identifies a percentage difference between the battery level of the first earbud and the battery level of the second earbud.

Example 12

The method of any of the examples 6-11, further including the processor in the charging case commencing charging the first earbud when the battery level of the first earbud is less than a charging threshold value.

Example 13

The method of any of the examples 6-12, further including the processor in the charging case sending the instruction message to the first earbud indicating the first earbud should switch roles with the second earbud in response to the first earbud reaching full charge.

Example 14

The method of any of the examples 6-13, further including the processor in the charging case ceasing charging the first earbud and commencing charging the second earbud in response to sending the instruction message to the first earbud indicating the first earbud should switch roles with the second earbud.

Example 15

The method of any of the examples 6-13, further including the processor in the charging case ceasing charging the first earbud and commencing charging the second earbud in response to determining that the first earbud has entered a dormant mode and the second earbud has entered the deep sleep mode.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, or any other medium that may be used to store desired program code in the form of instructions or data structures and that may be accessed by a computer. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. An earbud comprising:
    a timer; and
    a processor configured to:
        start the timer upon beginning to operate in a dormant mode, the dormant mode being a transitional low-power state in which the timer is active;
        send a message, upon expiration of the timer, to a paired earbud indicating that the earbud is to transition from operating in the dormant mode to operating in a deep sleep mode, the deep sleep mode being a lower-power state, distinct from the dormant mode, in which the timer is inactive at the earbud and the earbud periodically broadcasts an advertisement; and
        receive a message from the paired earbud indicating that the earbud should transition from operating in the dormant mode to operating in the deep sleep mode.

2. The earbud of claim 1, wherein the processor is further configured to:
    monitor while in the deep sleep mode for a message from the paired earbud indicating that the paired earbud is to transition from operating in the dormant mode to operating in the deep sleep mode; and
    transition to the dormant mode in response to receiving the message from the paired earbud.

3. The earbud of claim 1, wherein the processor is further configured to include battery level information in broadcast advertisements.

4. The earbud of claim 3, wherein the processor is further configured to:
    determine a battery differential index (BDI) value based on a difference between a battery level of the earbud and a battery level of the paired earbud; and
    send an instruction message to the paired earbud indicating the paired earbud should transition from operating in the dormant mode to operating in the deep sleep mode in response to determining that the BDI exceeds a battery threshold value.

5. The earbud of claim 4, wherein the processor is further configured to:
    determine an advertising role duration value based on the BDI;
    include the advertising role duration value in the instruction message sent to the paired earbud indicating the paired earbud should transition from operating in the dormant mode to operating in the deep sleep mode;
    update the timer based on the advertising role duration value; and
    start the timer upon beginning to operate in the dormant mode.

6. A method of balancing a battery cycle of an earbud, the method comprising:
    starting, by a processor in the earbud, a timer upon beginning to operate in a dormant mode, the dormant mode being a transitional low-power state in which the timer runs;
    sending, upon expiration of the timer, a message to a paired earbud indicating that the earbud is to transition from operating in the dormant mode to operating in a deep sleep mode, the deep sleep mode being a lower-power state, distinct from the dormant mode, in which the timer is inactive at the earbud and the earbud periodically broadcasts an advertisement; and receiving a message from the paired earbud indicating that the earbud should transition from operating in the dormant mode to operating in the deep sleep mode.

7. The method of claim 6, further comprising:

monitoring while in the deep sleep mode for the message from the paired earbud indicating that the paired earbud is to transition from operating in the dormant mode to operating in the deep sleep mode; and transitioning to the dormant mode in response to receiving the message from the paired earbud.

8. The method of claim 6, further comprising including battery level information in broadcast advertisements.

9. The method of claim 8, further comprising:

determining a battery differential index (BDI) value based on a difference between a battery level of the earbud and a battery level of the paired earbud; and sending an instruction message to the paired earbud indicating the paired earbud should transition from operating in the dormant mode to operating in the deep sleep mode in response to determining that the BDI exceeds a battery threshold value.

10. The method of claim 9, further comprising:

determining an advertising role duration value based on the BDI;

including the advertising role duration value in the instruction message sent to the paired earbud indicating the paired earbud should transition from operating in the dormant mode to operating in the deep sleep mode;

updating the timer based on the advertising role duration value; and starting the timer upon beginning to operate in the dormant mode.

* * * * *